US012732015B2

(12) United States Patent
Shijo

(10) Patent No.: US 12,732,015 B2
(45) Date of Patent: Sep. 8, 2026

(54) UNINTERRUPTIBLE POWER SUPPLY, POWER SYSTEM, CONTROL DEVICE, AND CONTROL METHOD

(71) Applicant: KABUSHIKI KAISHA TOSHIBA, Tokyo (JP)

(72) Inventor: Tetsu Shijo, Tokyo (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 53 days.

(21) Appl. No.: 18/675,394

(22) Filed: May 28, 2024

(65) Prior Publication Data

US 2025/0096595 A1 Mar. 20, 2025

(30) Foreign Application Priority Data

Sep. 19, 2023 (JP) ................................ 2023-151721

(51) Int. Cl.
*H02J 9/06* (2006.01)
*H02J 3/32* (2026.01)
*H02J 7/82* (2026.01)
*H02J 7/90* (2026.01)

(52) U.S. Cl.
CPC ................ *H02J 9/062* (2013.01); *H02J 3/32* (2013.01); *H02J 7/82* (2026.01); *H02J 7/933* (2026.01); *H02J 2207/20* (2020.01)

(58) Field of Classification Search
CPC ...... H02J 9/062; H02J 7/0048; H02J 7/00712; H02J 3/32; H02J 2207/20
USPC ..................................................... 307/64, 23
See application file for complete search history.

(56) References Cited

U.S. PATENT DOCUMENTS 9,583,945 B2 2/2017 Watanabe
9,692,243 B2 6/2017 Kaji et al.
11,196,293 B2 12/2021 Uda et al.
11,888,341 B2 1/2024 Uno et al.
12,334,770 B2 6/2025 Matsumoto
(Continued)

FOREIGN PATENT DOCUMENTS

JP H161837 U 4/1989
JP WO2015075758 A1 5/2015
JP 2016015875 A 1/2016
(Continued)

OTHER PUBLICATIONS

24th Supply and Demand Adjustment Market Study Subcommittee, Jun. 23, 2021.

(Continued)

*Primary Examiner* — Michael R. Fin
(74) *Attorney, Agent, or Firm* — Holtz, Holtz & Volek PC

(57) ABSTRACT

According to one embodiment, An uninterruptible power supply connectable to a power line via which electric power from a power grid is supplied to a load device, comprising: a storage battery being chargeable/dischargeable; a monitor configured to monitor a state of charge of the storage battery; and a controller configured to control charging the storage battery from the power line and discharging from the storage battery to the power line, based on the state of charge of the storage battery and a difference between a first frequency being operation frequency of the power grid and a second frequency serving as a reference operation frequency for the power grid.

13 Claims, 20 Drawing Sheets

(56) References Cited

U.S. PATENT DOCUMENTS

| | | | | |
|---|---|---|---|---|
| 2011/0121791 | A1 * | 5/2011 | Basham | H02J 7/00 320/137 |
| 2024/0313565 | A1 | 9/2024 | Shijo | |

FOREIGN PATENT DOCUMENTS

| | | | |
|---|---|---|---|
| JP | 2016167015 | A | 9/2016 |
| JP | 6338131 | B1 | 6/2018 |
| JP | 2019041527 | A | 3/2019 |
| JP | 2022038059 | A | 3/2022 |
| JP | 2022173860 | A | 11/2022 |
| JP | 7218453 | B1 | 2/2023 |
| JP | 2024131883 | A | 9/2024 |
| WO | 2022233457 | A1 | 11/2022 |

OTHER PUBLICATIONS

Installed Poland's largest hybrid battery storage system and began full-scale demonstration operation, Oct. 2, 2020.

Smart Community Demonstration Project in the Federal Republic of Germany, Jul. 25, 2018.

Alapera, et al., "Fast frequency response from a UPS system of a data center background and pilot results", 16th Int. Conf. Eur. Energy Mark. EEM, pp. 1-5, Sep. 2019.

Japanese Office Action (and an English language translation thereof) dated Jan. 23, 2026, issued in corresponding Japanese Application No. 2023-151721.

* cited by examiner

UNINTERRUPTIBLE POWER SUPPLY, POWER SYSTEM, CONTROL DEVICE, AND CONTROL METHOD

CROSS REFERENCE TO RELATED APPLICATIONS

This application is based upon and claims the benefit of priority from the prior Japanese Patent Application No. 2023-151721, filed on Sep. 19, 2023, the entire contents of which are incorporated herein by reference.

FIELD

The present embodiments relate to an uninterruptible power supply, a power system, a control device, and a control method.

BACKGROUND

There is an uninterruptible power supply that has a function to support a power grid, by charging to and discharging from a storage battery of the uninterruptible power supply, as a power reserve for frequency containment reserves, fast frequency response, primary frequency control, and the like, in response to a change in operation frequency of the power grid (grid frequency).

However, supplying the power reserve to the power grid from the storage battery of the uninterruptible power supply may lower the state of charge (SoC) of the storage battery to a level below a power supply amount required for the load side of the uninterruptible power supply in case of power outage. In this case, electric power cannot be stably supplied to the load side.

DETAILED DESCRIPTION

According to one embodiment, An uninterruptible power supply connectable to a power line via which electric power from a power grid is supplied to a load device, comprising: a storage battery being chargeable/dischargeable; a monitor configured to monitor a state of charge of the storage battery; and a controller configured to control charging the storage battery from the power line and discharging from the storage battery to the power line, based on the state of charge of the storage battery and a difference between a first frequency being operation frequency of the power grid and a second frequency serving as a reference operation frequency for the power grid.

First Embodiment

Figure 1:
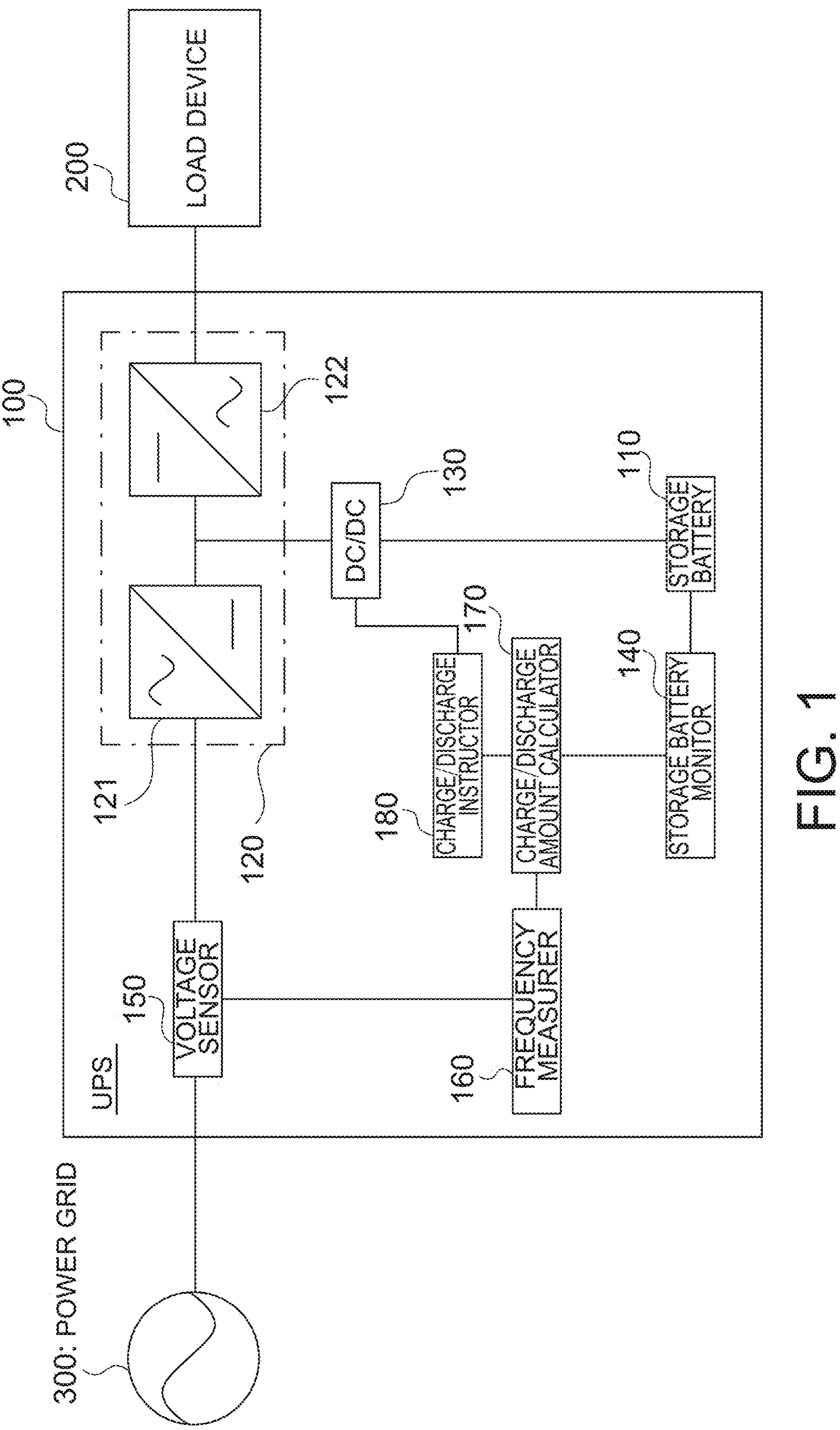
FIG. 1 is a drawing illustrating an exemplary power system according to the present embodiment.

FIG. 1 illustrates an exemplary power system according to the present embodiment. The power system of FIG. 1 includes an uninterruptible power supply (UPS) 100, a load device 200, and a power grid 300. The power grid 300 is a system that causes power generation equipment to generate electric power, and transmits the generated electric power to power receiving equipment of a consumer for electric power supply to the consumer. The load device 200 is an example of the consumer's power receiving equipment, and is a server provided in a facility such as a data center or a factory. The uninterruptible power supply 100 includes a chargeable/dischargeable storage battery 110, and supports operations of the power grid 300 by the supply (including discharge and charge) of power reserve for the power grid 300. Supplying the power reserve can stabilize power supply from the power grid 300 to the consumer. Alternatively, the uninterruptible power supply 100 may always supply electric power to (or discharge electricity from) the load device 200, separately, in parallel with the supply of power reserve to the power grid 300. In the following description, the power supply of the uninterruptible power supply 100 will be mainly focused on the supply of power reserve. The load device 200 operates using electric power supplied from the power grid 300 and electric power supplied from the uninterruptible power supply 100 (electric power supplied as the power reserve and electric power always supplied, if such electric power is separately available). The uninterruptible power supply 100 is installed on the consumer side, and is different from the equipment belonging to the power grid 300.

The UPS 100 includes, in addition to the storage battery 110, an adjuster 120, a DC/DC converter 130, a storage battery monitor 140, a voltage sensor 150, a frequency measurer 160, a charge/discharge amount calculator 170, and a charge/discharge instructor 180 (controller). The adjuster 120 includes an AC/DC converter 121 and a DC/AC converter 122.

The storage battery 110 is a chargeable/dischargeable battery. The storage battery 110 is, for example, a lithium-ion battery or a lead storage battery. The storage battery 110 can be charged when receiving electric power supplied from the power grid 300, via the AC/DC converter 121 and the DC/DC converter 130. Further, the storage battery 110 can supply electric power to the load device 200 by discharging the stored electric power, via the DC/DC converter 130 and the DC/AC converter 122.

The DC/DC converter 130 is an inverter that controls charging and discharging of the storage battery 110, based on an instruction of the charge/discharge instructor 180. The inverter may be a constant-voltage inverter or a constant-current inverter.

The storage battery monitor 140 monitors the state of charge (SoC) of the storage battery 110. The state of charge is expressed, for example, by the ratio of the amount of electricity stored to the capacity of the battery, and is a value not less than 0 and not greater than 1. However, the state of charge may be expressed by the value directly representing the amount of electricity stored or may be ranked appropriately.

The voltage sensor 150 is connected to the power grid 300 and measures the voltage of the power grid 300 (grid voltage).

The frequency measurer 160 measures the frequency of the power grid 300 (operation frequency or grid frequency) based on measurement information available from the voltage sensor 150.

The charge/discharge amount calculator 170 holds information on a plurality of charge/discharge patterns in which a difference between the grid frequency and a reference frequency (or a reference operation frequency of the grid frequency), that is a deviation of the grid frequency from reference frequency (frequency deviation), is associated with charge/discharge power (charging power or discharging power). The charge/discharge power may be referred to as power reserve. The charge/discharge amount calculator 170 can selectively switch a charge/discharge pattern to be used from among the plurality of charge/discharge patterns. As an example, the charge/discharge amount calculator 170 can switch between a first charge/discharge pattern and a second charge/discharge pattern. The selected charge/discharge pattern is referred to as a use charge/discharge pattern. The charge/discharge amount calculator 170 defines a difference between the reference frequency of the grid frequency and the grid frequency (measurement frequency of the power grid 300), as a frequency deviation (hereinafter, simply referred to as "deviation"), and specifies a power reserve corresponding to the deviation in the use charge/discharge pattern. In the present embodiment, the difference is calculated by "measurement frequency−reference frequency". However, the above definition of the difference is a mere example, and the arithmetic direction may be reversed or the ratio of these frequencies may be used for definition. The charge/discharge pattern may be configured by a database such as a lookup table, or may be a mathematical function for calculating an output variable value according to an input variable value. In this case, the value of the above-described deviation is allocated to the input variable, and the output variable output from the mathematical function represents the power reserve.

The charge/discharge instructor 180 is a controller that controls the DC/DC converter 130 so that charging/discharging can be performed with the power reserve calculated by the charge/discharge amount calculator 170. The charge/discharge instructor 180 transmits, to the DC/DC converter 130, instruction information on the charging or discharging to be performed with the charge/discharge power calculated by the charge/discharge amount calculator 170. The DC/DC converter 130 controls the storage battery 110 so as to perform charging or discharge with electric power according to the instruction information.

Hereinafter, with reference to FIG. 2 to FIG. 7, examples of the switchable a plurality of charge/discharge patterns and charge/discharge pattern switching control in the charge/discharge amount calculator 170 will be described.

Figure 2:
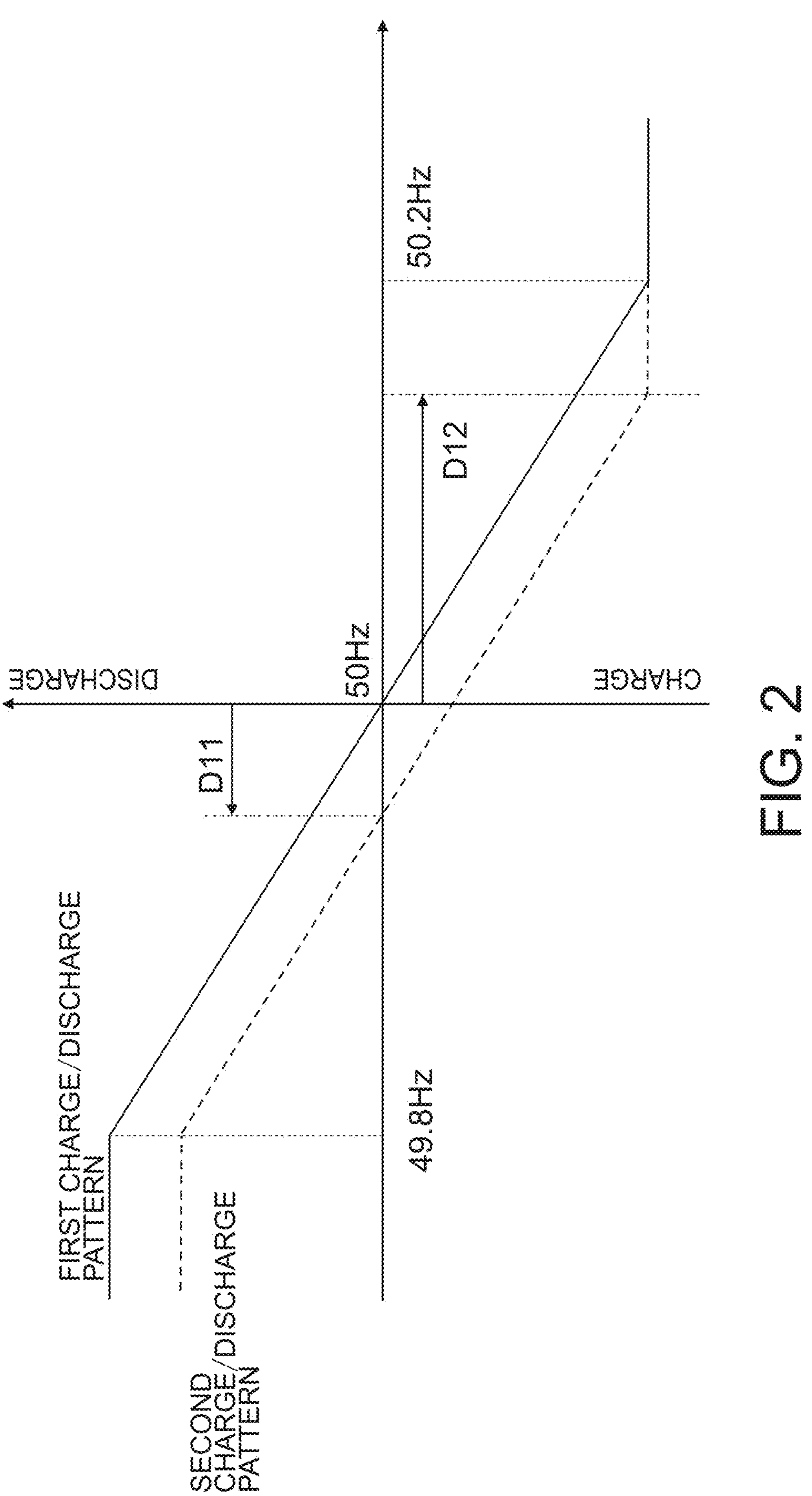
FIG. 2 is a drawing illustrating examples of a first charge/discharge pattern and a second charge/discharge pattern.
Figure 3:
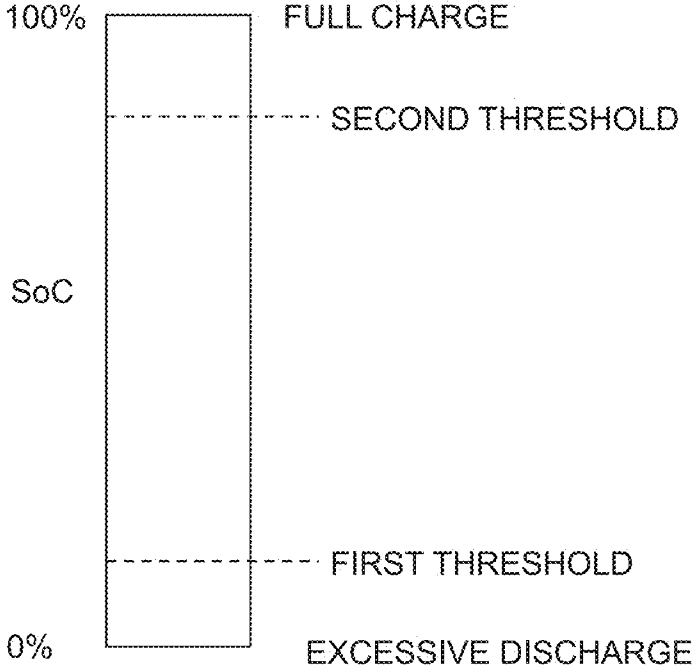
FIG. 3 is a drawing illustrating an exemplary relationship between a first threshold and a second threshold in comparison with the state of charge.

FIG. 2 illustrates examples of the first charge/discharge pattern and the second charge/discharge pattern. When the amount of electricity (charging amount) stored in the storage battery 110 is less than a first threshold, the second charge/discharge pattern is used. When the charging amount of the storage battery 110 is not less than the first threshold and less than a second threshold, the first charge/discharge pattern is used. The case where the charging amount of the storage battery 110 is not less than the second threshold will be described below. FIG. 3 illustrates an exemplary relationship between the first threshold and the second threshold in comparison with the state of charge. A range not less than the first threshold and less than the second threshold corresponds to an ordinary range. A range less than the first threshold corresponds to a range below the ordinary range. A range not less than the second threshold corresponds to a range above the ordinary range.

As illustrated in FIG. 2, the first charge/discharge pattern specifies that charging and discharging are not performed when the deviation from the reference frequency is equal to a first predetermined value (zero, in this embodiment). The first charge/discharge pattern specifies that when the deviation is greater than zero, that is, when the grid frequency is greater than the reference frequency, the storage battery 110 is charged with electric power whose value increases with increasing deviation. In this case, the value 0 (i.e., zero) corresponds to the first predetermined value. However, when the deviation becomes greater than 0.2 Hz (=50.2 Hz−50 Hz), the charging power is kept constant. When the sum of the charging power by the power reserve and the power consumption in the load device 200 exceeds a rated value of the AC/DC converter 121, the charging power by the power reserve may be reduced. When the deviation is less than zero, that is, when the grid frequency is less than the reference frequency, the storage battery 110 is discharged with electric power whose value increases with decreasing deviation. However, when the deviation becomes less than −0.2 Hz (=49.8 Hz-50 Hz), the discharging power is kept constant. Further, although the reference frequency of the grid frequency is 50 Hz in this embodiment, it may be 60 Hz. Discharging the storage battery 110 makes the receiving electric power from UPS grid appear lower. Further, when the discharge amount from the storage battery 110 becomes greater than the power consumption in the load device connected to the UPS, electric power may be discharged to the power grid 300 side as regenerative electric power to the power grid 300. In the case of discharging electric power to the power grid 300 side, another load device located in the premises where the UPS is installed may consume the discharged electric power. Further, in order to prevent reverse power flow due to the regenerative electric power to the power grid 300, the discharging power from the storage battery 110, serving as the power reserve, can be lowered against an occurrence of the regenerative electric power to the power grid 300. It may be useful to connect the UPS to a reverse power relay (RPR) to stop the power reserve supplied from the UPS if the reverse power flow occurs.

The second charge/discharge pattern specifies that charging and discharging are not performed when the deviation is equal to a predetermined value D11. The second charge/discharge pattern specifies that when the deviation is greater than the predetermined value D11 (second predetermined value), the storage battery 110 is charged with electric power whose value increases with increasing deviation. However, when the deviation becomes greater than D12, the charging power is kept constant. When the deviation is less than the predetermined value D11, the storage battery 110 is discharged with electric power whose value increases with decreasing deviation. However, when the deviation becomes less than −0.2 Hz, the discharging power is kept constant. The predetermined value D12 is a real number greater than zero. The predetermined value D11 is a real number less than zero.

The charge/discharge amount calculator 170, by switching from the first charge/discharge pattern to the second charge/discharge pattern, can prevent the storage battery 110 from being in an excessively discharged state (shortage in remaining amount) when the state of charge of the storage battery 110 changes from a state not less than the first threshold to a state less than the first threshold. On the other hand, when the state of charge of the storage battery 110 changes from a state less than the first threshold to a state not less than the first threshold, switching from the second charge/discharge pattern to the first charge/discharge pattern to supply electric power to the power grid 300 can stably supply electric power to the load device 200.

Figure 4:
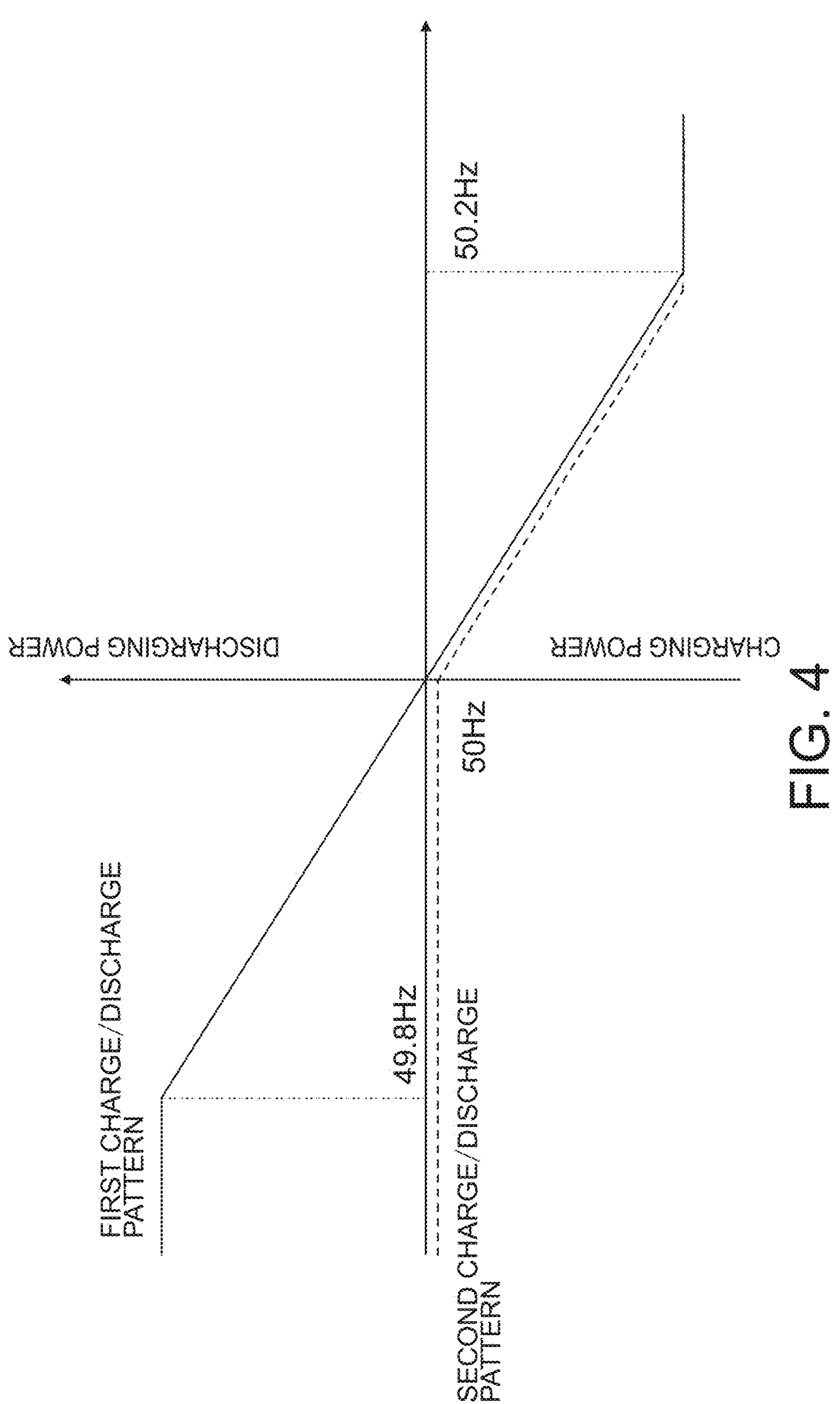
FIG. 4 is a drawing illustrating other examples of the first charge/discharge pattern and the second charge/discharge pattern.

FIG. 4 illustrates other examples of the first charge/discharge pattern and the second charge/discharge pattern. Like the case of FIG. 2, when the state of charge of the storage battery 110 is less than the first threshold, the second charge/discharge pattern is used. When the state of charge of the storage battery 110 is not less than the first threshold and less than the second threshold, the first charge/discharge pattern is used. However, the first charge/discharge pattern is the same as that in FIG. 2, but the second charge/discharge pattern is different in content from that in FIG. 2.

The second charge/discharge pattern specifies that charging and discharging are not performed when the deviation is equal to or less than a third predetermined value (zero in this embodiment). The second charge/discharge pattern specifies that when the deviation is greater than zero, the storage battery 110 is charged with electric power whose value increases with increasing deviation. However, when the deviation becomes greater than 0.2 Hz, the charging power is kept constant. Performing no discharging when the deviation is not greater than zero can prevent the storage battery 110 from being in an excessively discharged state.

Figure 5:
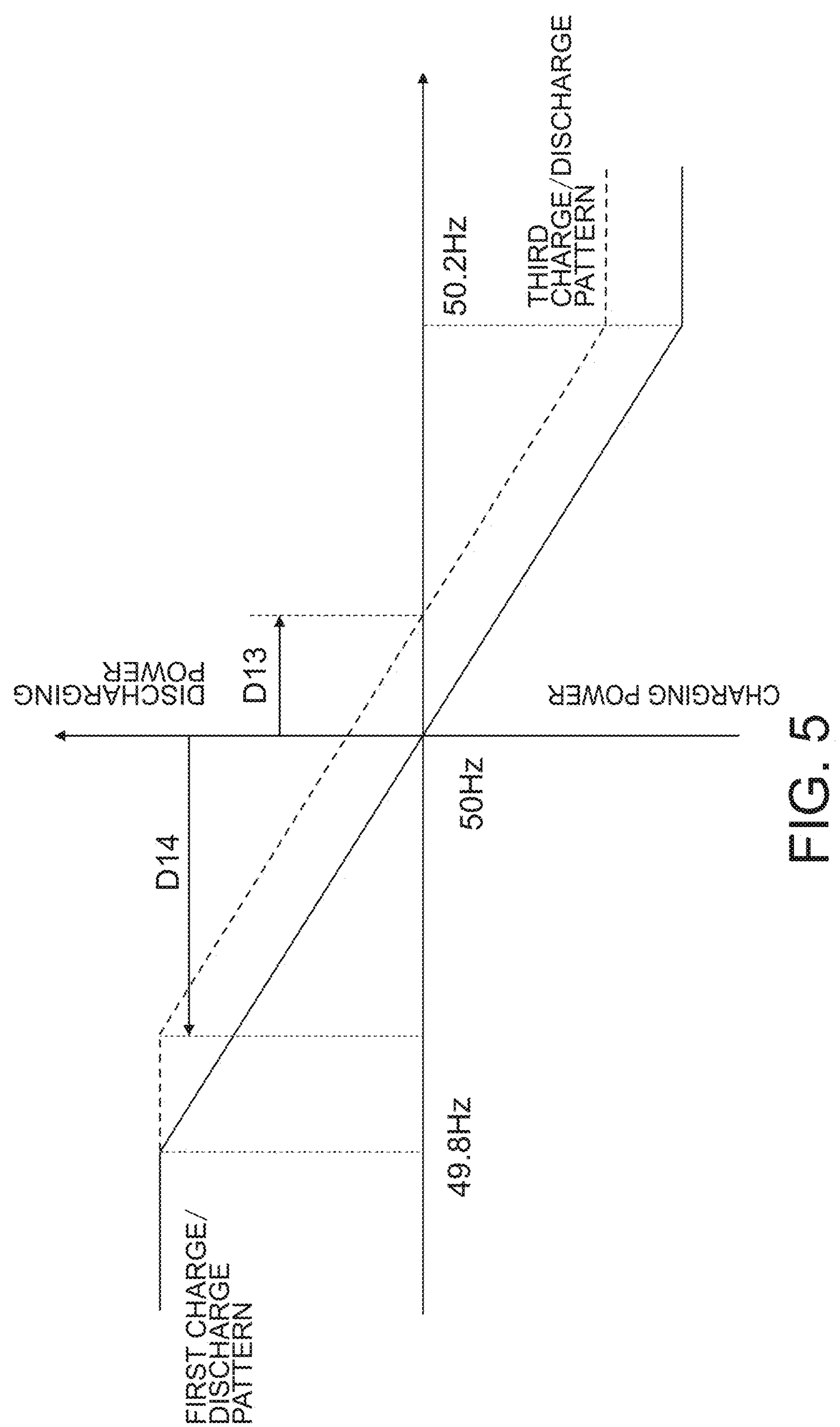
FIG. 5 is a drawing illustrating examples of the first charge/discharge pattern and a third charge/discharge pattern.

FIG. 5 illustrates examples of the first charge/discharge pattern and a third charge/discharge pattern. The charge/discharge amount calculator 170 uses the first charge/discharge pattern when the state of charge of the storage battery 110 is not less than the first threshold and less than the second threshold, and uses the third charge/discharge pattern when the state of charge of the storage battery 110 is not less than the second threshold. The first charge/discharge pattern is the same as that in FIG. 2. The second threshold is illustrated in FIG. 3. Hereinafter, the third charge/discharge pattern will be described.

As illustrated in FIG. 5, the third charge/discharge pattern specifies that charging and discharging are not performed when the deviation from the reference frequency is equal to a predetermined value D13 (fourth predetermined value). The third charge/discharge pattern specifies that when the deviation is greater than the predetermined value D13, the storage battery 110 is charged with electric power whose value increases with increasing deviation. However, when the deviation becomes greater than 0.2 Hz, the charging power is kept constant. The predetermined value D13 is a real number greater than zero. When the deviation is less than the predetermined value D13, the storage battery 110 is discharged with electric power whose value increases with decreasing deviation. However, when the deviation becomes less than a predetermined value D14, the discharging power is kept constant. The predetermined value D14 is a real number less than zero.

The charge/discharge amount calculator 170 can prevent the storage battery 110 from being in an excessively charged state (excessive remaining amount) by switching from the first charge/discharge pattern to the third charge/discharge pattern when the state of charge of the storage battery 110 changes from a state less than the second threshold to a state not less than the second threshold.

Figure 6:
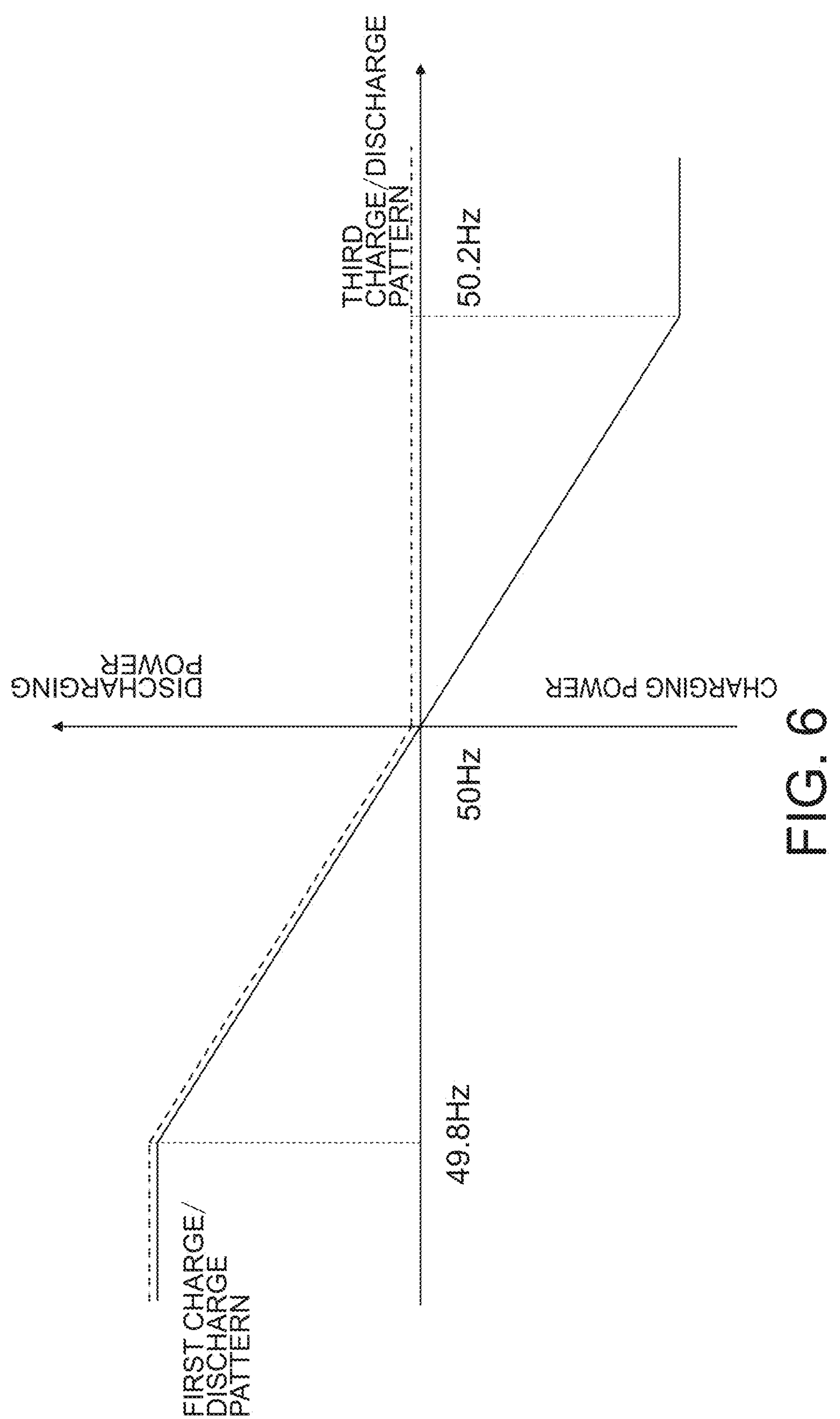
FIG. 6 is a drawing illustrating other examples of the first charge/discharge pattern and the third charge/discharge pattern.

FIG. 6 illustrates other examples of the first charge/discharge pattern and the third charge/discharge pattern. When the state of charge of the storage battery 110 is not less than the first threshold and less than the second threshold, the first charge/discharge pattern is used like the case of FIG. 5. When the state of charge of the storage battery 110 is not less than the second threshold, the third charge/discharge pattern is used. The first charge/discharge pattern is the same as that in FIG. 2, but the third charge/discharge pattern is different in content from that in FIG. 2.

The third charge/discharge pattern specifies that charging and discharging are not performed when the deviation is not less than a fifth predetermined value (zero in this embodiment). The third charge/discharge pattern specifies that when the deviation is less than zero, the storage battery 110 is discharged with electric power whose value increases with decreasing deviation. However, when the deviation becomes less than −0.2 Hz, the discharging power is kept constant. Performing no charging when the deviation is not less than zero can prevent the storage battery 110 from being in an excessively charged state.

Figure 7:
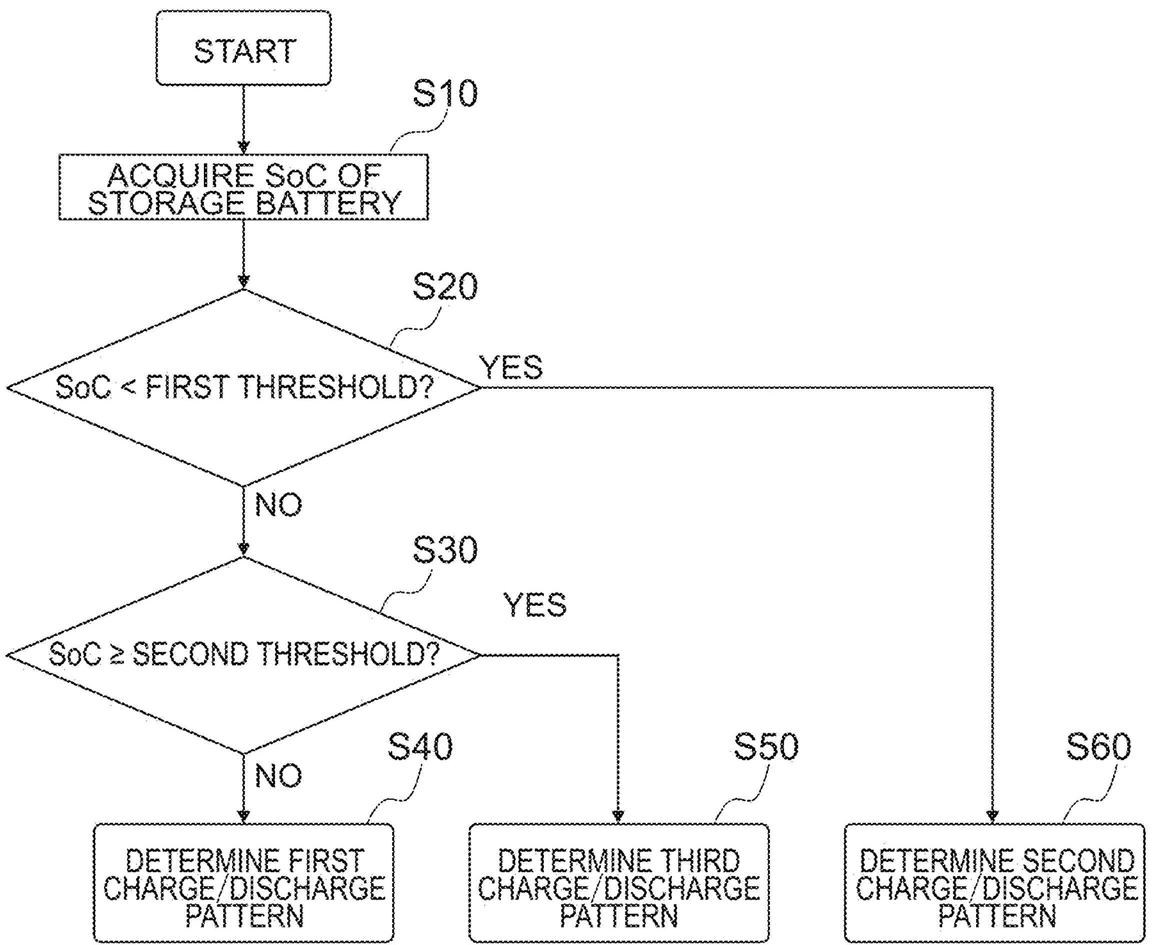
FIG. 7 is a flowchart illustrating exemplary processing in which a charge/discharge amount calculator determines a charge/discharge pattern.

FIG. 7 is a flowchart illustrating exemplary processing in which the charge/discharge amount calculator 170 determines the charge/discharge pattern. The charge/discharge amount calculator 170 acquires, from the storage battery monitor 140, information on the state of charge (SoC) of the storage battery 110 (S10), and if the state of charge is less than the first threshold, the charge/discharge amount calculator 170 determines the second charge/discharge pattern (S60). If the state of charge is not less than the first threshold and less than the second threshold, the charge/discharge amount calculator 170 determines the first charge/discharge pattern (S40). If the state of charge is not less than the second threshold, the charge/discharge amount calculator 170 determines the third charge/discharge pattern (S50).

As described above, according to the first embodiment, switching the charge/discharge pattern of the electric power supplied to the load device 200 according to the state of charge of the storage battery 110 can stably supply the power reserve to the power grid 300 while preventing the storage battery 110 from being in an excessively charged or excessively discharged state.

In the present embodiment, the state of charge of the storage battery 110 is acquired, the charge/discharge pattern according to the state of charge is selected, and the power reserve (charged/discharged electric power) supplied to the power grid 300 is determined based on the selected charge/discharge pattern and the frequency deviation. As another method, a mathematical function that reflects a relationship between the state of charge, each charge/discharge pattern, and the frequency deviation may be generated in advance, and the power reserve may be determined using this mathematical function. For example, a variable representing the state of charge and a variable representing the frequency deviation are used as input variables of the mathematical function, and a variable representing the power reserve (charged/discharged electric power) is used as an output variable. In this case, the power reserve can be determined by allocating the acquired state of charge and the calculated frequency deviation to respective input variables to calculate the mathematical function and obtaining the output variable as a calculation result. This makes it possible to more quickly calculate the power reserve and supply the power reserve to the power grid 300.

Second Embodiment

Figure 8:
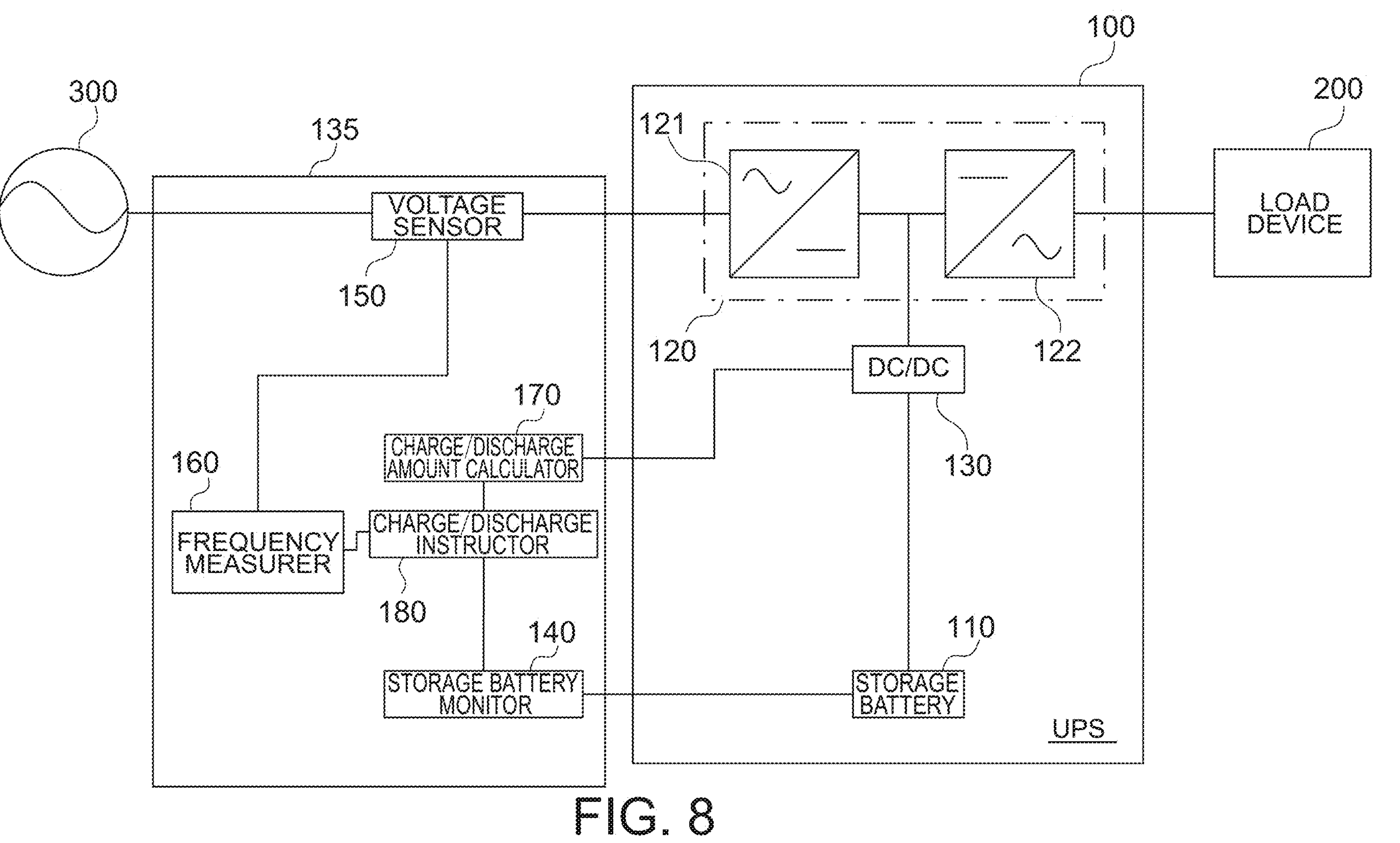
FIG. 8 is a drawing illustrating an exemplary power system according to the present embodiment.

FIG. 8 illustrates an exemplary power system according to the present embodiment. Elements with the same names as those in FIG. 1 are given the same reference numerals, and descriptions thereof will be omitted as appropriately. Hereinafter, portions different from those of the power system in FIG. 1 will be mainly described. The storage battery monitor 140, the voltage sensor 150, the frequency measurer 160, the charge/discharge amount calculator 170, and the charge/discharge instructor 180 are separated from a housing of the UPS 100 and incorporated in a control device 135 that is independent from the UPS 100. The control device 135 is connected to the UPS 100 via an external interface cable (e.g., a bus cable). The instruction information can be transmitted from the charge/discharge instructor 180 to the DC/DC converter 130 via the interface cable. The storage battery monitor 140 can acquire, via the interface cable, information indicating the state of the storage battery 110. The UPS 100 and the control device 135 may be connected by wire or wirelessly. In this case, wireless communicators may be provided in the control device 135 and the UPS 100.

In the example illustrated in FIG. 8, the constituent elements 140 to 170 are separated from the UPS 100, but only some of the constituent elements 140 to 170 may be separated from the UPS 100 and the rest may be included in the UPS 100.

As described above, according to the second embodiment, even when the whole or part of the functions of the present embodiment is separated from the UPS 100, the functions of the present embodiment can be easily realized by externally connecting an existing UPS to the control device installing the separated functions.

Third Embodiment

Figure 9:
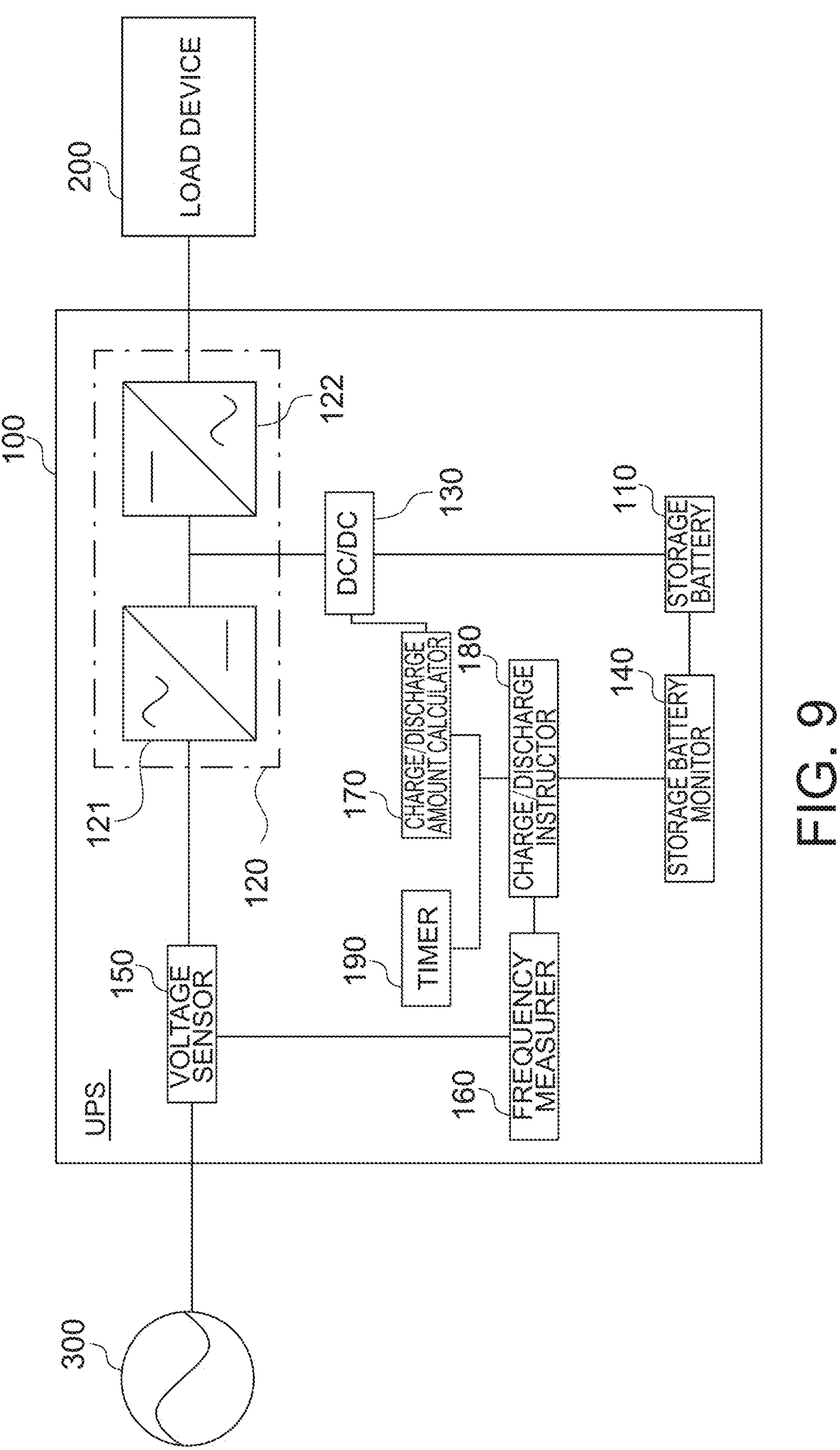
FIG. 9 is a drawing illustrating an exemplary power system according to the present embodiment.

FIG. 9 illustrates an exemplary power system according to the present embodiment. In the power system of FIG. 9, the UPS 100 includes a timer 190. In the first charge/discharge pattern according to the first embodiment, when the grid frequency becomes less than the reference frequency, discharging is continuously performed with electric power corresponding to the frequency deviation. However, in the present embodiment, the time for discharging is limited. Specifically, after start of discharging, the period of time during which the discharging can be performed is limited to "first period of time". Once the first period of time has elapsed without any change (e.g., without switch to charging or stop of discharging), the UPS 100 stops the AC/DC converter 121 or stops the supply of power reserve to the power grid 300, regardless of the value of deviation at that time. However, even after the timer 190 operates, electric power supply to a load device connected to the UPS (discharging to protect the load device as an original UPS function rather than as the power reserve for the power grid 300) may continue. The present embodiment can be said for modifying a discharge region pattern part of the first charge/discharge pattern in the first embodiment.

Figure 10:
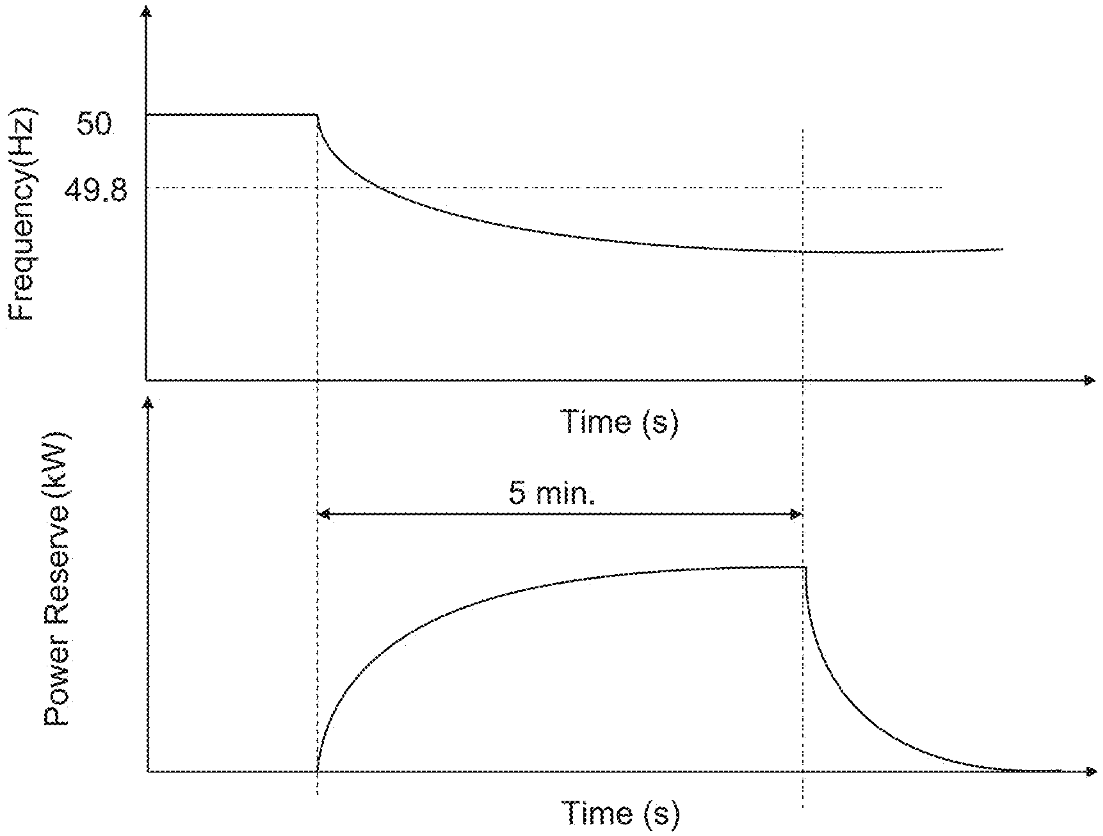
FIG. 10 is a drawing illustrating a relationship between a change in grid frequency and a power reserve to be supplied.

An upper part of FIG. 10 illustrates a change in the grid frequency. This is an example in which a power plant such as a thermal power plant is shut down due to an earthquake, for example, and the grid frequency is decreasing below the reference frequency (50 Hz).

When the grid frequency becomes less than the reference frequency (50 Hz), the UPS 100 detects this event and activates the timer 190. The timer 190 starts counting the elapsed time. After the count start of timer 190, the charge/discharge instructor 180 increases the power reserve (discharging power in this embodiment) along a curve whose gradient is steep initially and decreases gradually as illustrated in a lower part of the drawing. When the timer count exceeds the first period of time (five minutes in the example illustrated in the drawing), the timer 190 times out and outputs a timeout signal. The charge/discharge instructor 180 stops supplying the power reserve according to the timeout signal. This prevents the state of charge (SoC) of the storage battery 110 from decreasing.

In the present embodiment, the discharging power is used as the power reserve, but the charging power can also be used. In this case, the power reserve illustrated in the lower part of the drawing may be regarded as the charging power and processing similar to that in the case of discharging power can be performed. In this case, when the grid frequency becomes greater than the reference frequency, the charging is performed only during the first period of time, and the charging is stopped once the first period of time has elapsed. This can prevent the storage battery 110 from being excessively charged. This operation corresponds to a modification of a charge region pattern part of the first charge/discharge pattern.

In the present embodiment, although the exemplary modification of the discharge/charge region pattern part of the first charge/discharge pattern has been described, similar modification is applicable to the second charge/discharge pattern or the third charge/discharge pattern.

Fourth Embodiment

A fourth embodiment is an embodiment in which a plurality of uninterruptible power supplies (UPSs) are provided. In the present embodiment, the plurality of UPSs supply the power reserve (charging power or discharging power) to the power grid 300.

Figure 11:
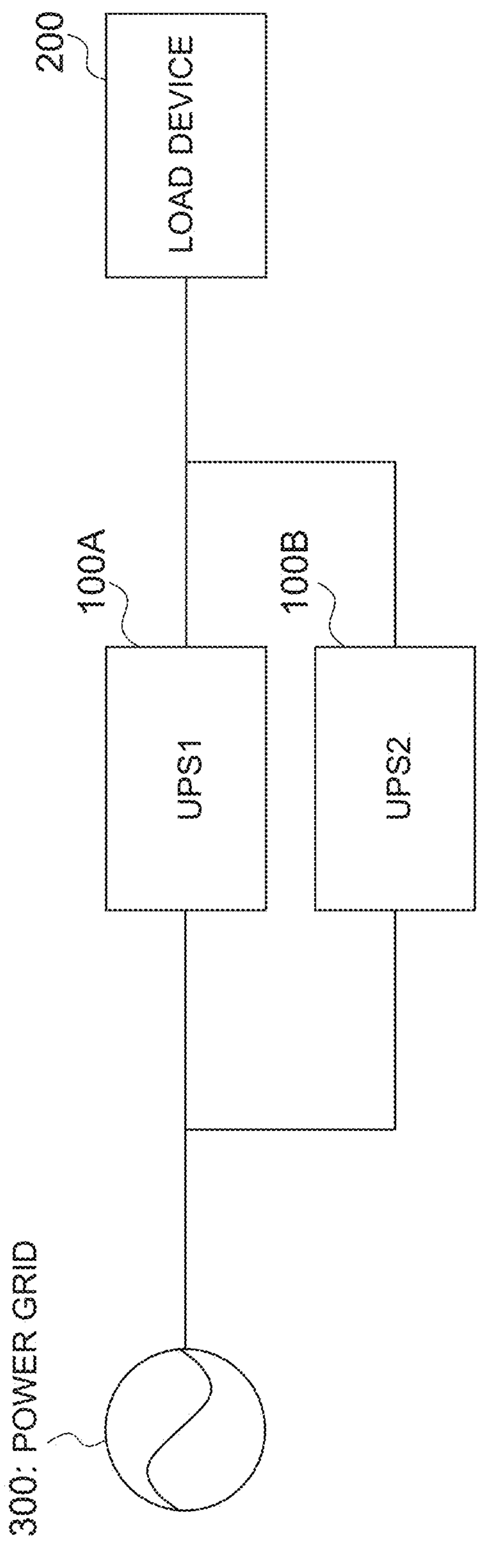
FIG. 11 is a drawing illustrating an exemplary power system according to a fourth embodiment.
Figure 12:
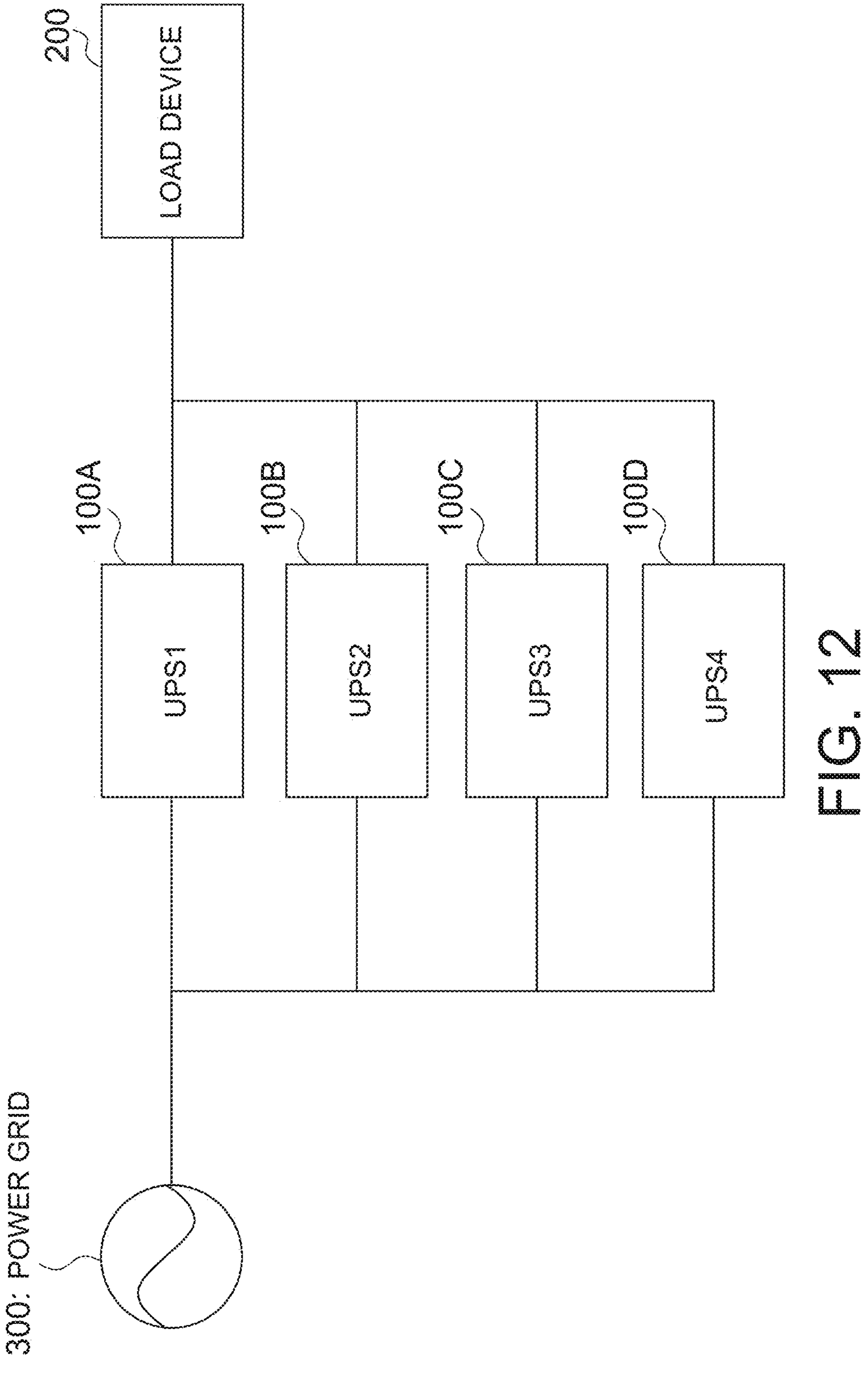
FIG. 12 is a drawing illustrating another exemplary configuration of the power system including four UPSs.

FIG. 11 illustrates an exemplary power system according to the fourth embodiment, in which two UPSs 100A and 100B are provided. More specifically, the UPSs 100A and 100B are parallel to each other and connected to the power grid 300 at one end and also connected to the load device 200 at the other end. Although the total number of UPSs is two in the example of FIG. 11, three or more UPSs may be provided. FIG. 12 illustrates another exemplary configuration of the power system in which the total number of the UPSs is 4. Two UPSs 100C and 100D are provided in addition to the configuration of FIG. 11.

In FIG. 11 or FIG. 12, the block configuration of each UPS may be similar to that in the first to third embodiments. Hereinafter, portions different from those in the first to third embodiments will be mainly described. The example of FIG. 11 in which two UPSs are provided will be described below, although the processing can be expanded in the same way even in other cases where three or more UPSs are provided.

The present embodiment is characterized in that the power reserve of each UPS is determined according to the priority of each UPS in addition to the frequency deviation representing the deviation between the grid frequency and the reference frequency. Here, considered in this embodiment is a case where the state of charge of each UPS is in the ordinary range (not less than the first threshold and less than the second threshold) and the first charge/discharge pattern is applied to each UPS. Setting of the first threshold and the second threshold may be different in each UPS. The present embodiment is characterized in that setting content of the first charge/discharge pattern for each UPS depends on the priority of each UPS. Note that charge/discharge prediction required for each UPS is also taken into consideration in advance to determine the content of each first charge/discharge pattern, and it is assumed that as long as the prediction accuracy is high the power receiving state of each storage battery will basically fall within the ordinary range (not less than the first threshold and less than the second threshold) and maintaining the first charge/discharge pattern will be feasible. If the prediction is inaccurate and the state of charge of at least one UPS is outside the ordinary range (less than the first threshold or not less than the second threshold), this UPS is switched to the second charge/discharge pattern or the third charge/discharge pattern as in the first embodiment, meanwhile the UPS whose state of charge is within the ordinary range uses the above-described first charge/discharge pattern without any change. In this case, there is a possibility that the power reserve for the power grid 300 may not be sufficient for stable operation of the load device. However, in this case, priority is given to protection of the storage battery as the role of UPS.

Figure 13:
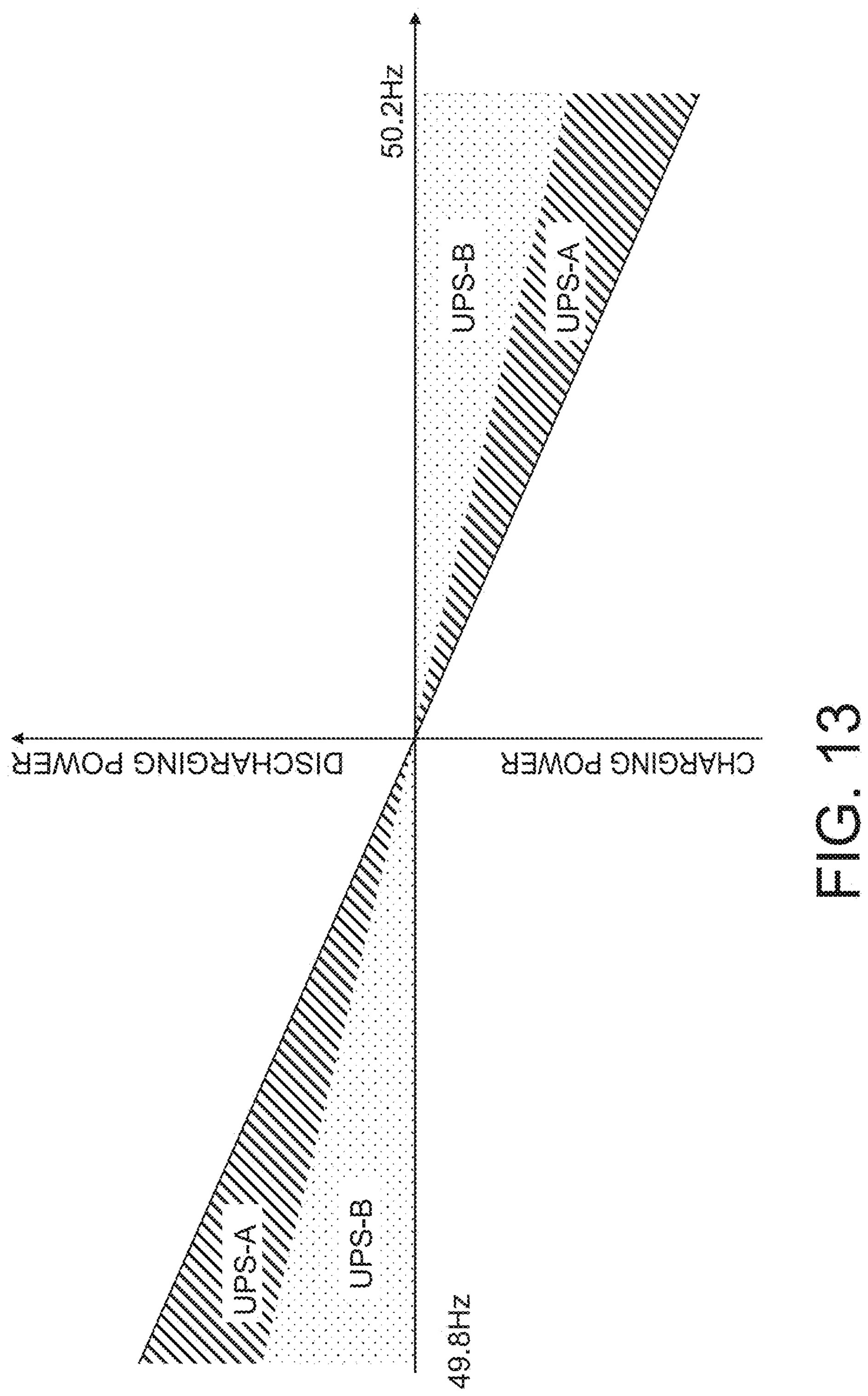
FIG. 13 is a drawing illustrating exemplary application of the same first charge/discharge pattern to two UPSs.

FIG. 13 illustrates exemplary first charge/discharge patterns applied to the UPSs 100A and 100B, respectively. However, for the sake of explanation, the sum of the first charge/discharge patterns applied to the UPSs 100A and 100B respectively is illustrated as a total charge/discharge pattern. Hereinafter, UPS-A represents one of the UPSs 100A and 100B and UPS-B represents the other UPS. The sum of the power reserve of UPS-A and the power reserve of UPS-B is the power reserve for the power grid 300. These two UPS-A and UPS-B share the power reserve at the same rate (regulating ratio) at any frequency. That is, UPS-A and UPS-B are the same in priority and each supplies the same power reserve.

Figure 14:
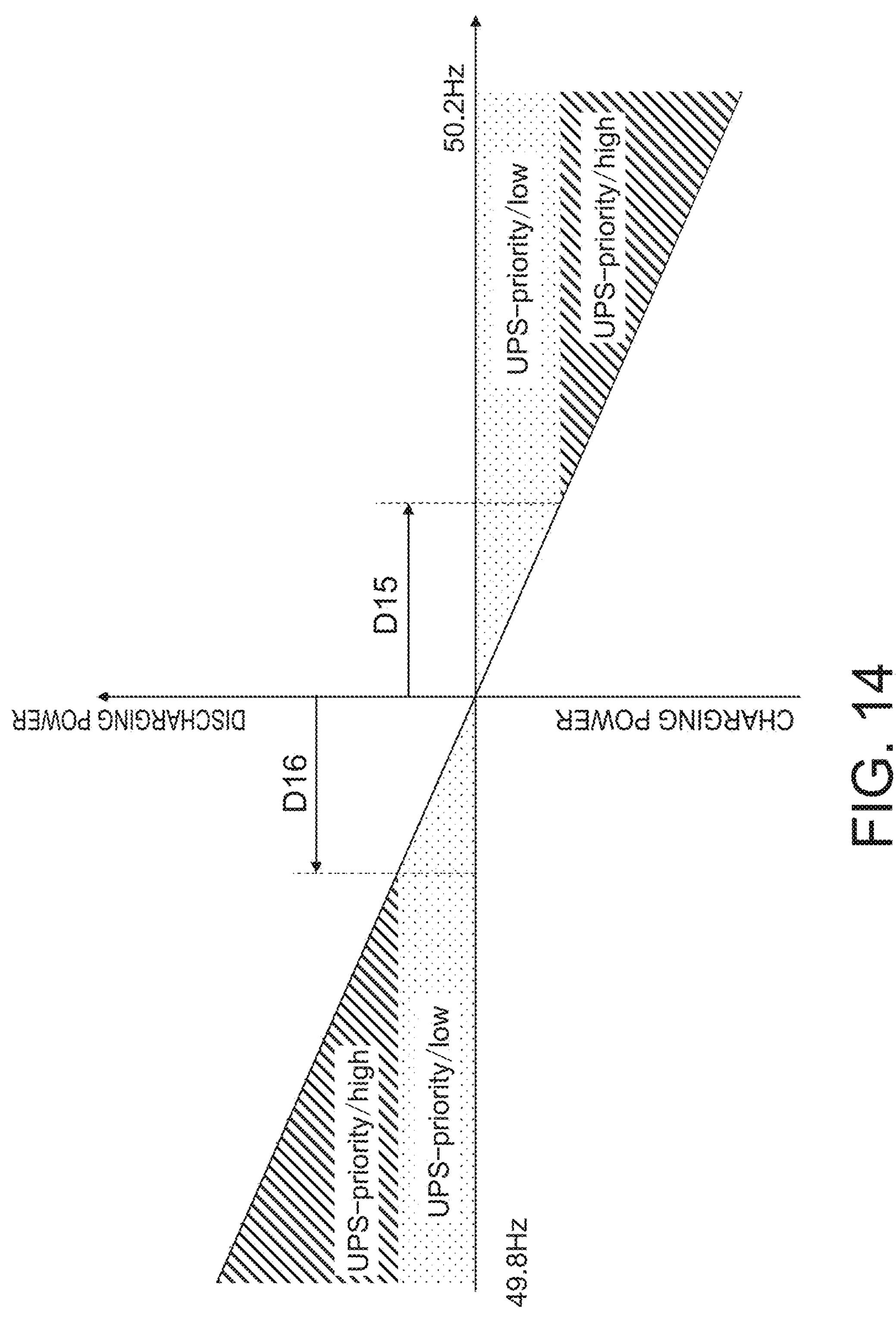
FIG. 14 is a drawing illustrating exemplary first charge/discharge patterns applied to two UPSs, respectively.

FIG. 14 illustrates exemplary first charge/discharge patterns applied to the UPSs 100A and 100B in such a manner that the opportunity of supplying the power reserve against frequency fluctuations increases in a lower-priority UPS (hereinafter, referred to as UPS-priority/low) rather than in a higher-priority UPS (hereinafter, referred to as UPS-priority/high). However, for the sake of explanation, the sum of the first charge/discharge patterns of the UPSs 100A and 100B respectively is illustrated as a total charge/discharge pattern. The higher-priority UPS is, for example, a UPS that supplies electric power to an infrastructure server that is relatively affected by a server stoppage. UPS-priority/high corresponds to a first uninterruptible power supply whose priority is high, and UPS-priority/low corresponds to a second uninterruptible power supply whose priority is low.

When the grid frequency is greater than the reference frequency 50 Hz, UPS-priority/high does not supply the power reserve (charged/discharged electric power=zero) in a range where the deviation is less than a predetermined value D15, and charges the storage battery 110 with charging power whose value increases with increasing deviation in a range not less than the predetermined value D15 (although the charging power is constant in a range not less than 50.2 Hz). When the grid frequency is less than the reference frequency 50 Hz, UPS-priority/high does not supply the power reserve in a range where the deviation is not less than a predetermined value D16, and discharges the storage battery 110 with discharging power whose value increases with decreasing deviation in a range less than the predetermined value D16 (although the discharging power is constant in a range less than 49.8 Hz). The range not less than the predetermined value D16 and less than the predetermined value D15 corresponds to a case where the deviation is within a first range with respect to the reference frequency.

Regarding the operation of UPS-priority/low, when the grid frequency is greater than the reference frequency 50 Hz, UPS-priority/low charges the storage battery 110 with charging power whose value increases with increasing deviation in the range where the deviation is less than the predetermined value D15, and charges the storage battery 110 with constant charging power in the range not less than the predetermined value D15. When the grid frequency is less than the reference frequency 50 Hz, UPS-priority/low performs discharging with discharging power whose value increases with decreasing deviation in the range where the deviation is not less than the predetermined value D16 and performs discharging with constant discharging power in the range less than the predetermined value D16.

This enables the lower-priority UPS to operate actively and can reduce the opportunity that the higher-priority UPS supplies the power reserve. Reducing the opportunity that the higher-priority UPS supplies the power reserve can reduce troubles that may occur in the higher-priority UPS.

The priority of each UPS described above may be explicitly set for the UPS as a priority value. Alternatively, the priority may be distinguished based on other criteria. An example will be described below, in which the priority is set depending on the type of the storage battery or each user.

Figure 15:
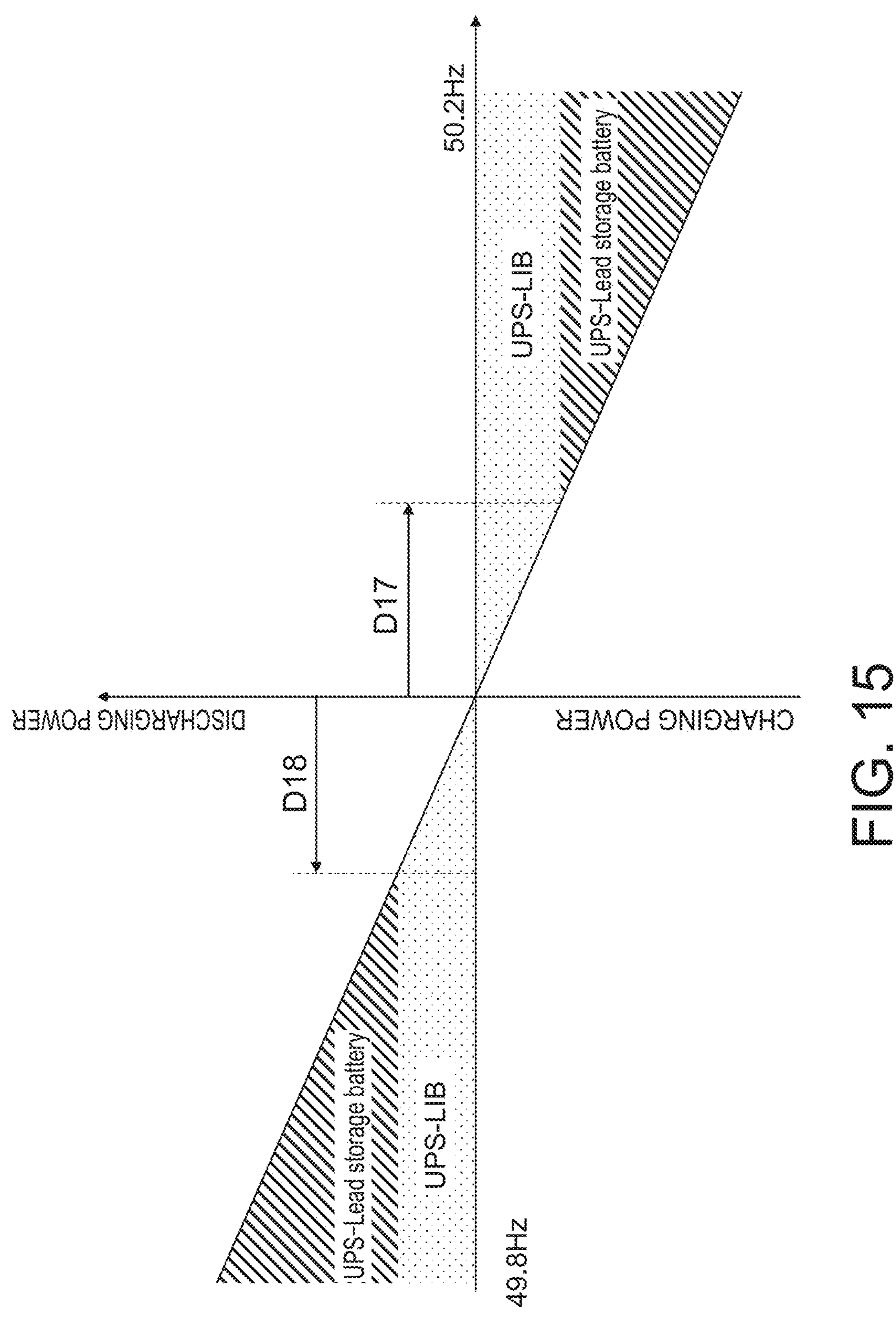
FIG. 15 is a drawing illustrating another exemplary first charge/discharge patterns applied to two UPSs respectively.

FIG. 15 illustrates exemplary first charge/discharge patterns respectively applied in a case where one of the UPSs 100A and 100B is a UPS using a lead storage battery (hereinafter, referred to as UPS-Lead storage battery) and the other is a UPS using a lithium-ion battery (hereinafter, referred to as UPS-LIB). However, for the sake of explanation, the sum of the first charge/discharge patterns applied to the UPSs 100A and 100B respectively is illustrated as a total charge/discharge pattern. UPS-Lead storage battery corresponds to the first uninterruptible power supply whose priority is high, and UPS-LIB corresponds to the second uninterruptible power supply whose priority is low.

When the grid frequency is greater than the reference frequency 50 Hz, UPS-Lead storage battery does not supply the power reserve in a range where the deviation is less than a predetermined value D17, and charges the storage battery 110 with charging power whose value increases with increasing deviation in a range not less than the predetermined value D17 (although the charging power is constant in the range not less than 50.2 Hz). When the grid frequency is less than the reference frequency 50 Hz, UPS-Lead storage battery does not supply the power reserve in a range where the deviation is not less than a predetermined value D18, and discharges the storage battery 110 with discharging power whose value increases with decreasing deviation in a range less than the predetermined value D18 (although the discharging power is constant in the range less than 49.8 Hz). The range not less than the predetermined value D18 and less than the predetermined value D17 corresponds to a case where the deviation is within the first range with respect to the reference frequency.

Regarding the operation of UPS-LIB, when the grid frequency is greater than the reference frequency 50 Hz, UPS-LIB charges the storage battery 110 with charging power whose value increases with increasing deviation in the range where the deviation is less than the predetermined value D17, and charges the storage battery 110 with constant charging power in the range not less than the predetermined value D17. When the grid frequency is less than the reference frequency 50 Hz, UPS-LIB performs discharging with discharging power whose value increases with decreasing deviation in a range where the deviation is not less than the predetermined value D18, and performs discharging with constant discharging power in the range less than the predetermined value D18.

As described above, causing UPS-LIB to operate actively can reduce the opportunity that UPS-Lead storage battery supplies the power reserve and can prevent the lead storage battery from deteriorating.

Figure 16:
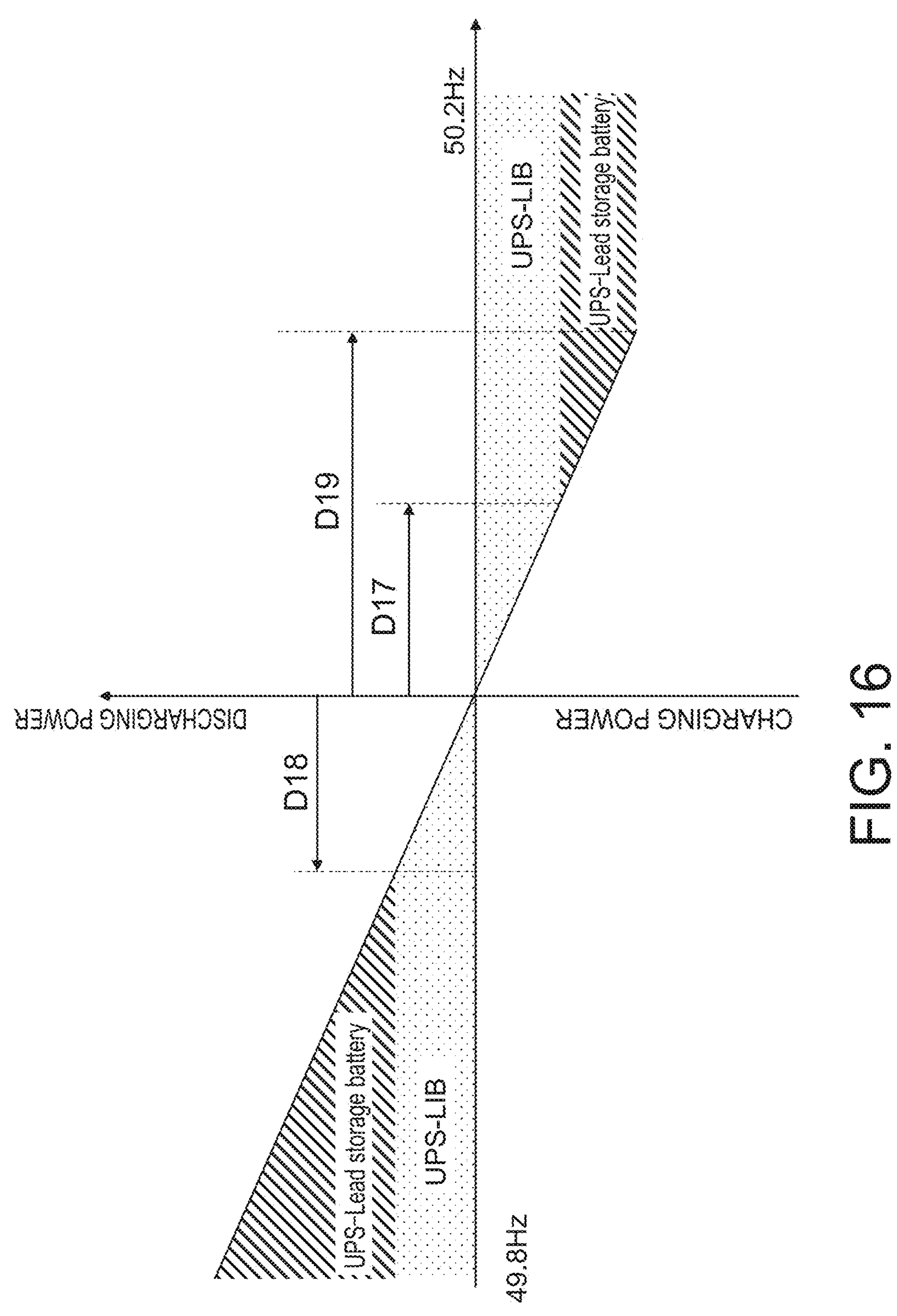
FIG. 16 is a drawing illustrating a partial modification of the first charge/discharge pattern for a UPS-Lead storage battery illustrated in FIG. 15.

FIG. 16 illustrates a partial modification of the first charge/discharge pattern for UPS-Lead storage battery illustrated in FIG. 15. In the charge region, when the deviation is not less than a predetermined value D19, UPS-Lead storage battery charges the storage battery 110 with constant charging power. The operation in the discharge region is similar to that in FIG. 15. The first charge/discharge pattern for UPS-LIB is the same as that in FIG. 15. In the first charge/discharge pattern for UPS-Lead storage battery, quickly charging the lead storage battery promotes the progress of deterioration, and therefore suppressing the charging speed can suppress the progress of deterioration. In the example illustrated in FIG. 16, the power reserve output from UPS-Lead storage battery is unsymmetrical between in a discharge direction and in a charging direction.

Figure 17:
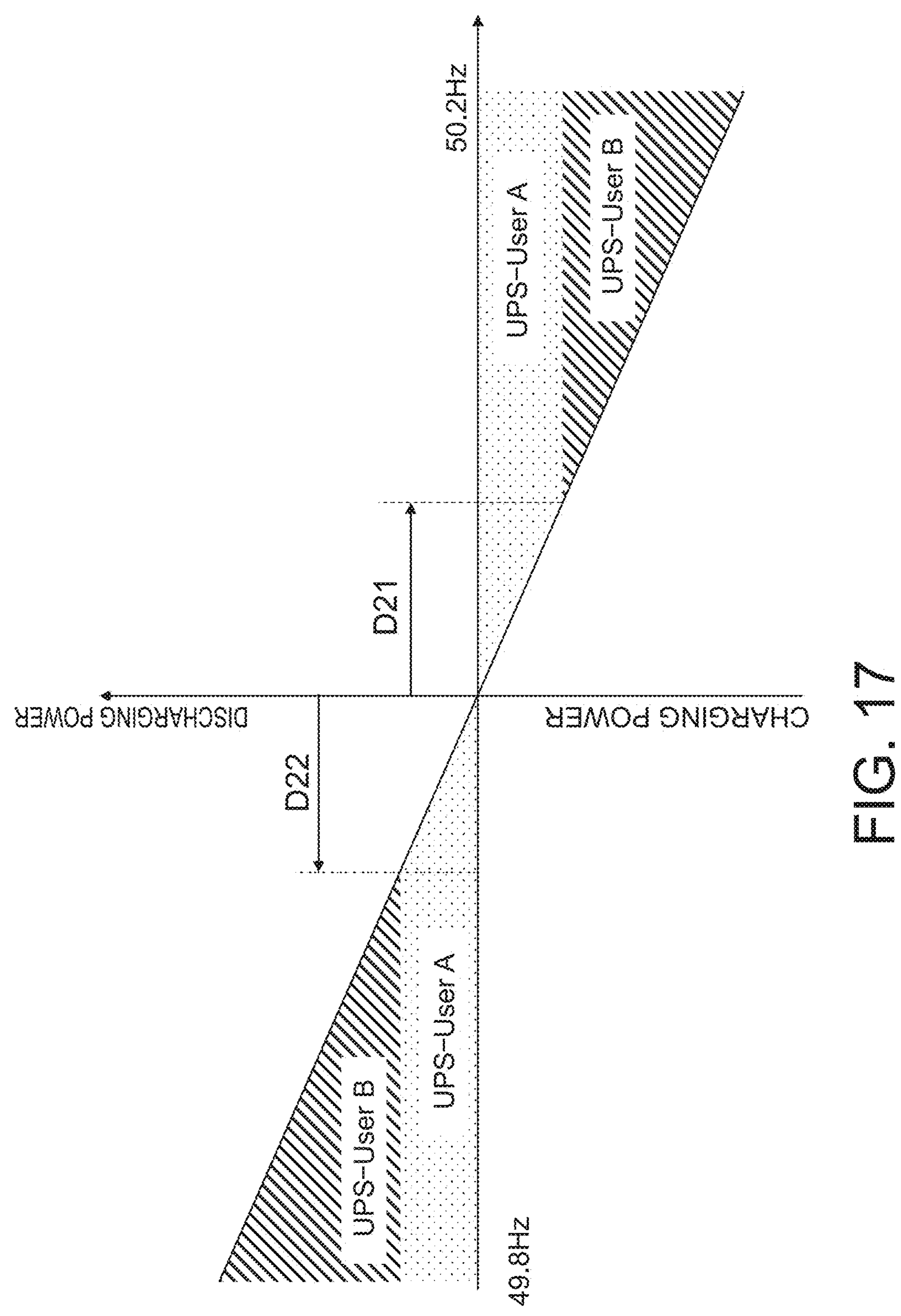
FIG. 17 is a drawing illustrating another exemplary first charge/discharge patterns applied to two UPSs respectively.

FIG. 17 illustrates another exemplary first charge/discharge patterns applied to the UPSs 100A and 100B, which are a plurality of UPSs placed in a data center. However, for the sake of explanation, the sum of the first charge/discharge patterns applied to the UPSs 100A and 100B respectively is illustrated as a total charge/discharge pattern. The priority order is determined for each UPS user, and each first charge/discharge pattern is set in such a manner that UPS of a higher priority user (UPS-User B) has fewer operating opportunities than UPS of a lower priority user (UPS-User A). UPS-User B corresponds to the first uninterruptible power supply whose priority is high, and UPS-User A corresponds to the second uninterruptible power supply whose priority is low. The operation of each UPS is basically similar to that in the case of FIG. 14, as described below.

When the grid frequency is greater than the reference frequency 50 Hz, UPS-User B does not supply the power reserve in a range where the deviation is less than a predetermined value D21 and charges the storage battery 110 with charging power whose value increases with increasing deviation in a range not smaller than the predetermined value D21 (although the charging power is constant in the range not less than 50.2 Hz). When the grid frequency is less than the reference frequency 50 Hz, UPS-User B does not supply the power reserve in a range where the deviation is not less than a predetermined value D22, and discharges the storage battery 110 with discharging power whose value increases with decreasing deviation in a range less than the predetermined value D22 (although the discharging power is constant in the range less than 49.8 Hz). The range not less than the predetermined value D22 and less than the predetermined value D21 corresponds to a case where the deviation is within the first range with respect to the reference frequency.

Regarding the operation of UPS-User A, when the grid frequency is greater than the reference frequency 50 Hz, UPS-User A charges the storage battery 110 with charging power whose value increases with increasing deviation in the range where the deviation is less than the predetermined value D21, and charges the storage battery 110 with constant charging power in the range not less than the predetermined value D21. When the grid frequency is less than the reference frequency 50 Hz, UPS-User A performs discharging with discharging power whose value increases with decreasing deviation in the range where the deviation is not less than the predetermined value D22, and performs discharging with constant discharging power in the range less than the predetermined value D22.

UPS usage fees may be determined according to the priority order. In the present embodiment, usage fees for higher-priority UPS-User B may be set to be higher than those for lower-priority UPS-User A. Reducing the opportunity that the higher-priority UPS-User B supplies the power reserve can reduce troubles that may occur in the higher-priority UPS-User B and cause a load device used by the user B to operate more stably.

Although in the above-described FIGS. 11 and 12 a plurality of UPSs are arranged in parallel with each other and connected to only one load device 200, configuring the UPS so as to be provided for each load device may be preferable in the case of using a plurality of load devices.

Figure 18:
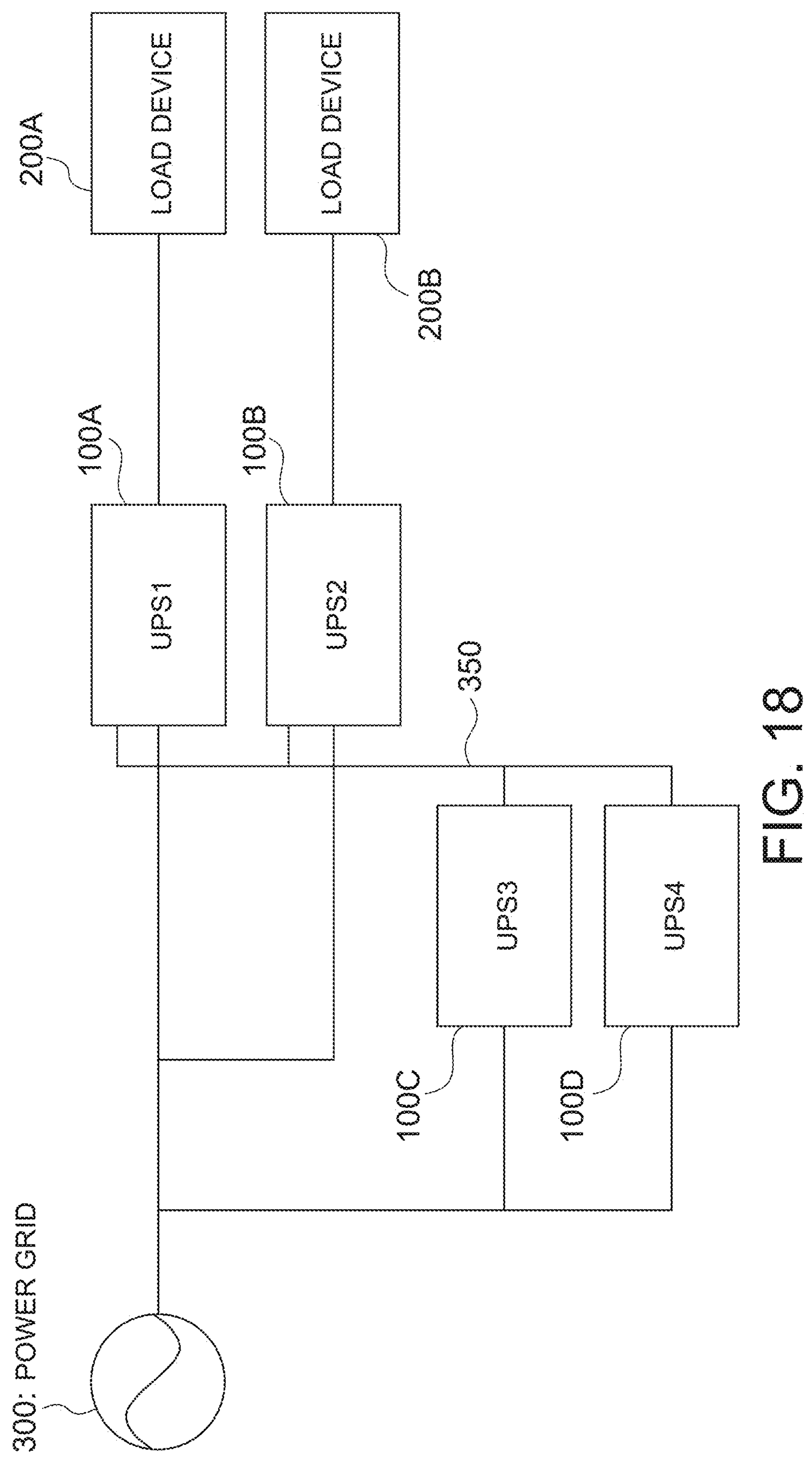
FIG. 18 is a drawing illustrating an exemplary configuration of another power system according to the present embodiment.

FIG. 18 illustrates another exemplary power system according to the present embodiment, in which a plurality of load devices 200A and 200B are provided and connected to the uninterruptible power supplies (UPSs) 100A and 100B, respectively. The UPSs 100A and 100B are connected to the power grid 300 in parallel with each other. Further, spare UPSs 100C and 100D are provided as a standby system. In case of failure in the UPS 100A or 100B, the standby UPS 100C or 100D operates. For example, if the UPS 100A is failed, the UPS 100C or the UPS 100D is connected, via a spare power line 350, to a power line between the power grid 300 and the load device 200A and can operate in place of the UPS 100A. Similarly, if the UPS 100B is failed, the UPS 100C or 100D can operate in place of the UPS 100B. The first charge/discharge pattern similar to those in FIGS. 12 to 16 can be applied to such UPSs 100A and 100B. When at least one of the UPSs 100A and 100B is failed and the standby UPS operates, the first charge/discharge patterns are applicable to two operating UPSs including the standby UPS, like FIG. 13 to FIG. 17. As in the embodiment of FIG. 11 or FIG. 12, not only the first charge/discharge pattern but also the second charge/discharge pattern or the third charge/discharge pattern are applicable depending on the state of charge of each storage battery. Although FIG. 18 illustrates an example including two load devices, similar operations can be realized by connecting UPSs to three or more load devices respectively.

Fifth Embodiment

The charge/discharge patterns illustrated in FIG. 2, FIG. 4 to FIG. 6, and FIG. 13 to FIG. 17 cause the power reserve to change at a constant gradient (linearly) in response to a change in deviation, except for the range in which the gradient is zero. However, the charge/discharge patterns may include stepwise changes.

Figure 19:
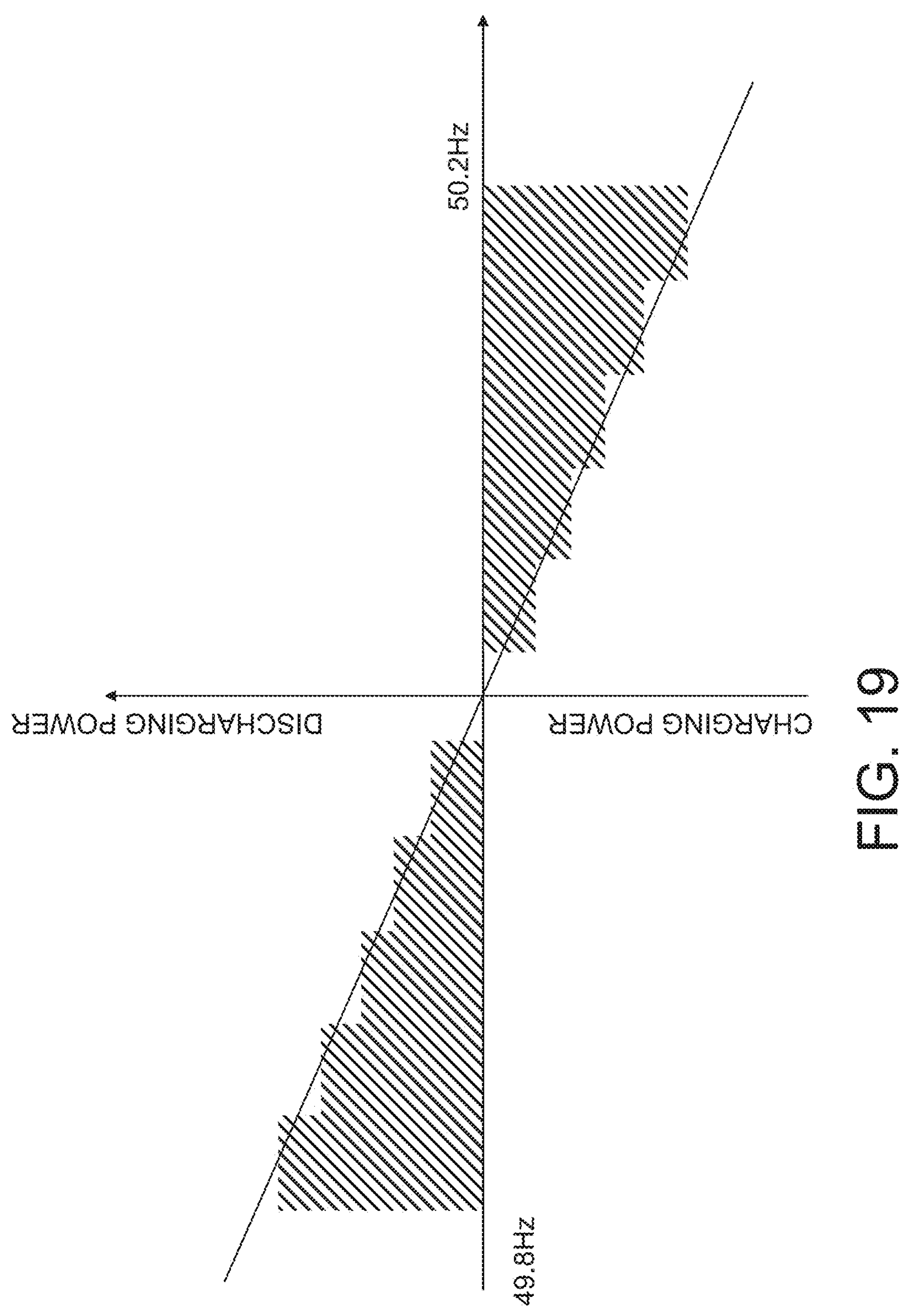
FIG. 19 is a drawing illustrating an exemplary first charge/discharge pattern including stepwise changes.

FIG. 19 illustrates an exemplary first charge/discharge pattern including stepwise changes. Similarly, the second charge/discharge pattern and the third charge/discharge pattern may have shapes including stepwise changes. Including stepwise changes has the advantage of reducing the number of levels of the power reserve.

Sixth Embodiment

In the first to fifth embodiments, the uninterruptible power supply (UPS) performs autonomous control for supplying the power reserve (discharging or charging the storage battery) against frequency fluctuations of the power grid 300. However, a sixth embodiment is characterized in that the UPS supplies the power reserve based on a command from a host control system.

Figure 20:
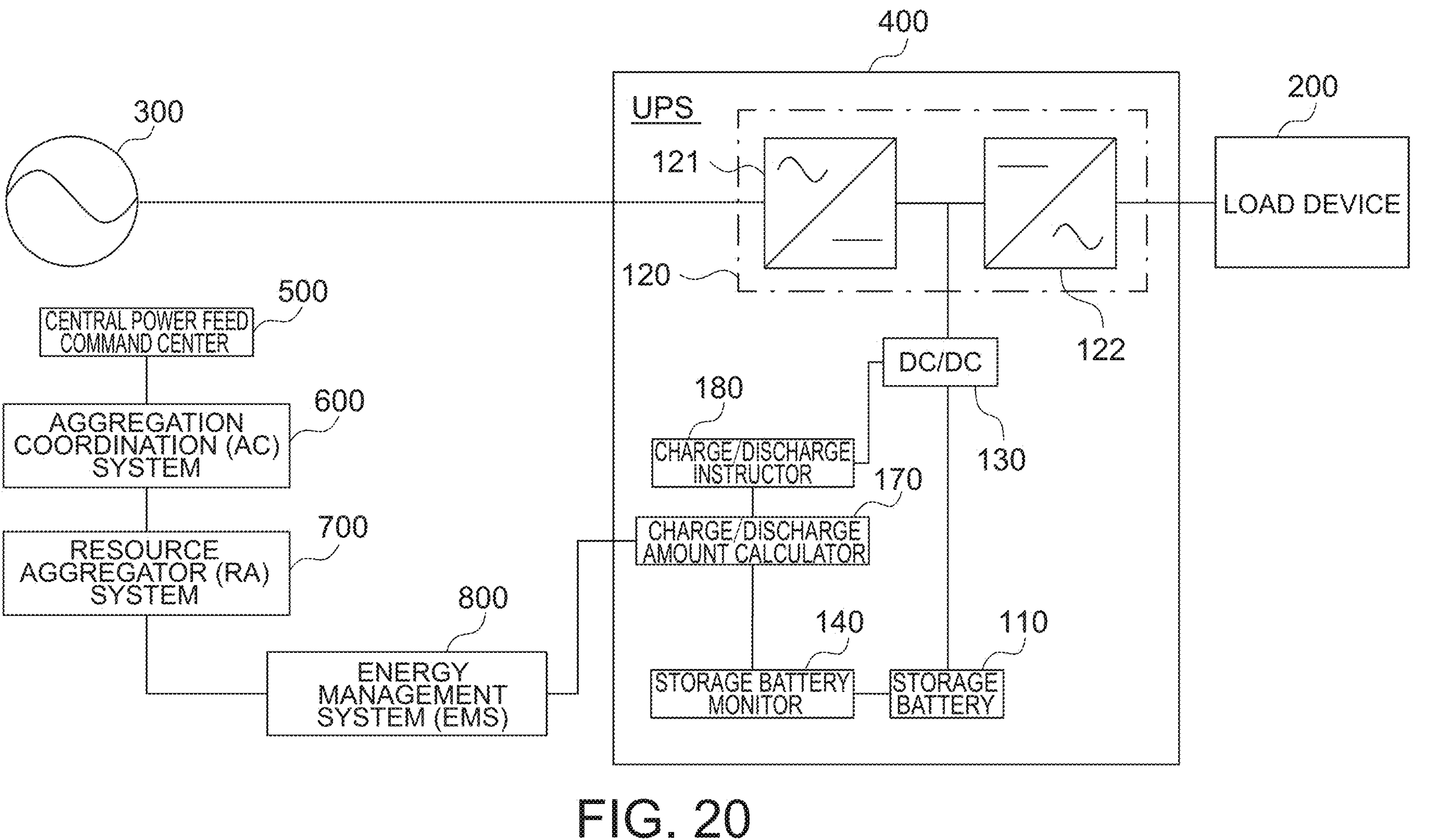
FIG. 20 is a drawing illustrating an exemplary power system according to a sixth embodiment.

FIG. 20 illustrates an exemplary power system according to the sixth embodiment, in which UPS 400 does not include the voltage sensor 150 and the frequency measurer 160. The charge/discharge amount calculator 170 is connected to an energy management system (EMS) 800 by wire or wirelessly.

A command for power reserve is transmitted, to the EMS 800, from a central power feed command center 500 serving as the host control system, via an aggregation coordination (AC) system 600 of an aggregator (specified wholesale supplier) and a resource aggregator (RA) system 700. The EMS 800 may be located in the same facility (e.g., data center) as the UPS 400. The EMS 800 outputs the command for power reserve to the UPS 400. Based on the command from the EMS 800, the charge/discharge amount calculator 170 transmits an instruction for power reserve (charge/discharge instruction) to the charge/discharge instructor 180.

As described above, according to the present embodiment, it is possible to cause the UPS 400 to output the power reserve according to the command from the host system. If frequency fluctuations can be detected speedily by the host system rather than by the UPS 400, the power reserve can be supplied to the power grid 300 more quickly and can cause the load device 200 to operate more stably. Further, since it is unnecessary to provide the voltage sensor 150 and the frequency measurer 160 in the UPS 400, the UPS 400 can be simplified in configuration.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The embodiments as described before may be configured as below.

(Clauses)

Clause 1. An uninterruptible power supply connectable to a power line via which electric power from a power grid is supplied to a load device, comprising:
- a storage battery being chargeable/dischargeable;
- a monitor configured to monitor a state of charge of the storage battery; and
- a controller configured to control charging the storage battery from the power line and discharging from the storage battery to the power line, based on the state of charge of the storage battery and a difference between a first frequency being operation frequency of the power grid and a second frequency serving as a reference operation frequency for the power grid.

Clause 2. The uninterruptible power supply according to clause 1, wherein the controller selects, from among a plurality of charge/discharge patterns in which the difference is associated with a charge/discharge power value to the power line, a charge/discharge pattern according to the state of charge of the storage battery, and controls charging and discharging of the storage battery based on the selected charge/discharge pattern and the difference.

Clause 3. The uninterruptible power supply according to clause 2, wherein the controller selects a first charge/discharge pattern when the state of charge is equal to or greater than a first threshold, and selects a second charge/discharge pattern when the state of charge is less than the first threshold.

Clause 4. The uninterruptible power supply according to clause 3, wherein
- the first charge/discharge pattern specifies charging power whose value increases with increasing difference when the difference is greater than a first predetermined value, and specifies discharging power whose value increases with decreasing difference when the difference is less than the first predetermined value,
- the second charge/discharge pattern specifies charging power whose value increases with increasing difference when the difference is greater than a second predetermined value, and specifies discharging power whose value increases with decreasing difference when the difference is less than the second predetermined value, and
- the first predetermined value is greater than the second predetermined value.

Clause 5. The uninterruptible power supply according to clause 3, wherein
- the second charge/discharge pattern specifies charging power whose value increases with increasing difference when the difference is greater than a third predetermined value, and specifies discharging power whose value is zero when the difference is less than the third predetermined value.

Clause 6. The uninterruptible power supply according to any one of clauses 3 to 5, wherein
- the controller selects a third charge/discharge pattern when the state of charge is equal to or greater than a second threshold, and the second threshold is greater than the first threshold.

Clause 7. The uninterruptible power supply according to clause 6, wherein
- the first charge/discharge pattern specifies charging power whose value increases with increasing difference when the difference is greater than a first predetermined value, and specifies discharging power whose value increases with decreasing difference when the difference is less than the first predetermined value,
- the third charge/discharge pattern specifies charging power whose value increases with increasing difference when the difference is greater than a fourth predetermined value, and specifies discharging power whose value increases with decreasing difference when the difference is less than the fourth predetermined value, and the fourth predetermined value is greater than the first predetermined value.

Clause 8. The uninterruptible power supply according to clause 6, wherein the third charge/discharge pattern specifies charging power of zero when the difference is greater than a fifth predetermined value, and specifies discharging power whose value increases with decreasing difference when the difference is less than the fifth predetermined value.

Clause 9. The uninterruptible power supply according to according to any one of clauses 3 to 8, wherein the state of charge is a ratio of the amount of electricity stored in the storage battery to the capacity of the storage battery.

Clause 10. The uninterruptible power supply according to according to any one of clauses 1 to 9, further comprising:

a timer configured to start counting a first period of time when the operation frequency of the power grid falls below a threshold, wherein the controller discharges the storage battery during the first period of time, and when the timer detects that the first period of time has elapsed, stops an AC/DC converter provided between the power grid and the load device to stop the discharging of the storage battery.

Clause 11. A power system comprising:

a first uninterruptible power supply serving as the uninterruptible power supply according to clause 1; and a second uninterruptible power supply serving as the uninterruptible power supply according to clause 1, wherein the first uninterruptible power supply has a priority higher than that of the second uninterruptible power supply, and charging/discharging of the second uninterruptible power supply is prioritized over charging/discharging of the first uninterruptible power supply when the difference between a first frequency and a second frequency is within a first range with respect to the second frequency.

Clause 12. The power system according to clause 11, wherein the first uninterruptible power supply is not charged or discharged when the difference is within the first range.

Clause 13. The power system according to clause 11 or 12, wherein the storage battery of the first uninterruptible power supply is a storage battery of a first type, and the storage battery of the second uninterruptible power supply is a storage battery of a second type that is different from the first type.

Clause 14. A control device which controls an uninterruptible power supply connectable to a power line via which electric power from a power grid is supplied to a load device, comprising:

a monitor configured to monitor a state of charge of a storage battery in the uninterruptible power supply; and a controller configured to control charging the storage battery from the power line and discharging from the storage battery to the power line, based on the state of charge of the storage battery and a difference between a first frequency being operation frequency of the power grid and a second frequency being a reference operation frequency for the power grid.

Clause 15. A control method which controls an uninterruptible power supply connectable to a power line via which electric power from a power grid is supplied to a load device, comprising:

monitoring a state of charge of a storage battery in the uninterruptible power supply; and controlling charging the storage battery from the power line and discharging from the storage battery to the power line, based on the state of charge of the storage battery and a difference between a first frequency being operation frequency of the power grid and a second frequency being a reference operation frequency for the power grid.

The invention claimed is:

1. An uninterruptible power supply connectable to a power line via which electric power from a power grid is supplied to a load device, comprising:

a storage battery that is chargeable/dischargeable;

a monitor configured to monitor a state of charge of the storage battery; and a controller configured to control charging the storage battery from the power line and discharging from the storage battery to the power line, based on the state of charge of the storage battery and a difference between a first frequency which is an operation frequency of the power grid and a second frequency which serves as a reference operation frequency for the power grid, wherein the controller selects, from among a plurality of charge/discharge patterns in which the difference is associated with a charge/discharge power value to the power line, a charge/discharge pattern according to the state of charge of the storage battery, and controls charging and discharging of the storage battery based on the selected charge/discharge pattern and the difference, and wherein the controller selects a first charge/discharge pattern when the state of charge is equal to or greater than a first threshold, and selects a second charge/discharge pattern when the state of charge is less than the first threshold.

2. The uninterruptible power supply according to claim 1, wherein:

the first charge/discharge pattern specifies charging power whose value increases with increasing difference when the difference is greater than a first predetermined value, and specifies discharging power whose value increases with decreasing difference when the difference is less than the first predetermined value, the second charge/discharge pattern specifies charging power whose value increases with increasing difference when the difference is greater than a second predetermined value, and specifies discharging power whose value increases with decreasing difference when the difference is less than the second predetermined value, and the first predetermined value is greater than the second predetermined value.

3. The uninterruptible power supply according to claim 1, wherein the second charge/discharge pattern specifies charging power whose value increases with increasing difference when the difference is greater than a third predetermined value, and specifies discharging power whose value is zero when the difference is less than the third predetermined value.

4. The uninterruptible power supply according to claim 1, wherein the controller selects a third charge/discharge pattern when the state of charge is equal to or greater than a second threshold, and the second threshold is greater than the first threshold.

5. The uninterruptible power supply according to claim 4, wherein:

the first charge/discharge pattern specifies charging power whose value increases with increasing difference when the difference is greater than a first predetermined value, and specifies discharging power whose value increases with decreasing difference when the difference is less than the first predetermined value, the third charge/discharge pattern specifies charging power whose value increases with increasing difference when the difference is greater than a fourth predetermined value, and specifies discharging power whose value increases with decreasing difference when the difference is less than the fourth predetermined value, and the fourth predetermined value is greater than the first predetermined value.

6. The uninterruptible power supply according to claim 4, wherein the third charge/discharge pattern specifies charging power of zero when the difference is greater than a fifth predetermined value, and specifies discharging power whose value increases with decreasing difference when the difference is less than the fifth predetermined value.

7. The uninterruptible power supply according to claim 1, wherein the state of charge is a ratio of an amount of electricity stored in the storage battery to a capacity of the storage battery.

8. An uninterruptible power supply connectable to a power line via which electric power from a power grid is supplied to a load device, comprising:

a storage battery being chargeable/dischargeable;

a monitor configured to monitor a state of charge of the storage battery;

a controller configured to control charging the storage battery from the power line and discharging from the storage battery to the power line, based on the state of charge of the storage battery and a difference between a first frequency being operation frequency of the power grid and a second frequency serving as a reference operation frequency for the power grid; and a timer configured to start counting a first period of time when the operation frequency of the power grid falls below a threshold, wherein the controller discharges the storage battery during the first period of time, and when the timer detects that the first period of time has elapsed, stops an AC/DC converter provided between the power grid and the load device to stop the discharging of the storage battery.

9. A power system comprising:

a first uninterruptible power supply and a second uninterruptible power supply, each of which comprises the uninterruptible power supply according to claim 1, wherein the first uninterruptible power supply has a priority higher than that of the second uninterruptible power supply, and wherein charging/discharging of the second uninterruptible power supply is prioritized over charging/discharging of the first uninterruptible power supply when the difference between the first frequency and the second frequency is within a first range with respect to the second frequency.

10. The power system according to claim 9, wherein the first uninterruptible power supply is not charged or discharged when the difference is within the first range.

11. The power system according to claim 9, wherein the storage battery of the first uninterruptible power supply is a storage battery of a first type, and the storage battery of the second uninterruptible power supply is a storage battery of a second type that is different from the first type.

12. A control device which controls an uninterruptible power supply connectable to a power line via which electric power from a power grid is supplied to a load device, comprising:

a monitor configured to monitor a state of charge of a storage battery in the uninterruptible power supply; and a controller configured to control charging the storage battery from the power line and discharging from the storage battery to the power line, based on the state of charge of the storage battery and a difference between a first frequency which is an operation frequency of the power grid and a second frequency which serves as a reference operation frequency for the power grid, wherein the controller selects, from among a plurality of charge/discharge patterns in which the difference is associated with a charge/discharge power value to the power line, a charge/discharge pattern according to the state of charge of the storage battery, and controls charging and discharging of the storage battery based on the selected charge/discharge pattern and the difference, and wherein the controller selects a first charge/discharge pattern when the state of charge is equal to or greater than a first threshold, and selects a second charge/discharge pattern when the state of charge is less than the first threshold.

13. A control method which controls an uninterruptible power supply connectable to a power line via which electric power from a power grid is supplied to a load device, comprising:

monitoring a state of charge of a storage battery in the uninterruptible power supply; and controlling charging the storage battery from the power line and discharging from the storage battery to the power line, based on the state of charge of the storage battery and a difference between a first frequency which is an operation frequency of the power grid and a second frequency which serves as a reference operation frequency for the power grid, wherein the controlling comprises selecting, from among a plurality of charge/discharge patterns in which the difference is associated with a charge/discharge power value to the power line, a charge/discharge pattern according to the state of charge of the storage battery, and controlling charging and discharging of the storage battery based on the selected charge/discharge pattern and the difference, and wherein the controlling selects a first charge/discharge pattern when the state of charge is equal to or greater than a first threshold, and selects a second charge/discharge pattern when the state of charge is less than the first threshold.

* * * * *